US011866193B2

(12) United States Patent
Guida

(10) Patent No.: US 11,866,193 B2
(45) Date of Patent: Jan. 9, 2024

(54) NON-INTRUSIVE FLIGHT DATA COLLECTION AND ANALYZATION WITH FLIGHT AUTOMATION

(71) Applicant: Volo Alto, LLC, Sagle, ID (US)

(72) Inventor: Nicholas R. Guida, Sagle, ID (US)

(73) Assignee: Volo Alto, LLC, Sagle, ID (US)

( * ) Notice: Subject to any disclaimer, the term of this patent is extended or adjusted under 35 U.S.C. 154(b) by 375 days.

(21) Appl. No.: 16/945,800

(22) Filed: Jul. 31, 2020

(65) Prior Publication Data

US 2021/0031940 A1 Feb. 4, 2021

Related U.S. Application Data

(60) Provisional application No. 62/881,850, filed on Aug. 1, 2019.

(51) Int. Cl.
| | |
|---|---|
| *B64D 45/00* | (2006.01) |
| *B64C 15/00* | (2006.01) |
| *G05D 1/10* | (2006.01) |
| *G07C 5/00* | (2006.01) |
| *G07C 5/08* | (2006.01) |
| *B64D 47/08* | (2006.01) |

(52) U.S. Cl.
CPC .............. *B64D 45/00* (2013.01); *B64C 15/00* (2013.01); *B64D 47/08* (2013.01); *G05D 1/101* (2013.01); *G07C 5/008* (2013.01); *G07C 5/085* (2013.01); *B64D 2045/0085* (2013.01)

(58) Field of Classification Search
USPC .......................................................... 701/14
See application file for complete search history.

(56) References Cited

U.S. PATENT DOCUMENTS

| | | | | |
|---|---|---|---|---|
| 11,390,178 | B1 * | 7/2022 | Wiegman | H02J 7/00034 |
| 2012/0007982 | A1 * | 1/2012 | Giuffrida | H04N 7/005 348/148 |
| 2013/0332004 | A1 * | 12/2013 | Gompert | G07C 5/0866 701/1 |
| 2017/0291715 | A1 * | 10/2017 | Jayathirtha | G06Q 10/06316 |

OTHER PUBLICATIONS

The International Preliminary Report on Patentability for PCT Application No. PCT/US20/44672, dated Feb. 10, 2022.
Invitation to Pay Fees dated Oct. 13, 2020 for Application PCT/US20/44672, "Non-Intrusive Flight Data Collection and Analyzation With Flight Automation Systems and Methods", 2 pages.

* cited by examiner

*Primary Examiner* — Tyler D Paige
(74) *Attorney, Agent, or Firm* — Lee & Hayes, P.C.

(57) ABSTRACT

A flight augmentation system with optical sensors to capture information from aircraft instruments. The system may determine a status of the aircraft based on the captured information and provide guidance to an operator. The system may collect long term data and determine an operational history of a pilot or an aircraft. The system may provide instruction based on the data or provide to interested third parties.

9 Claims, 16 Drawing Sheets

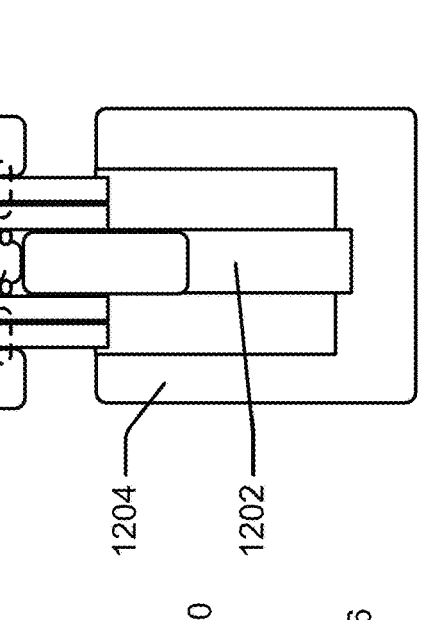
Fig. 12B
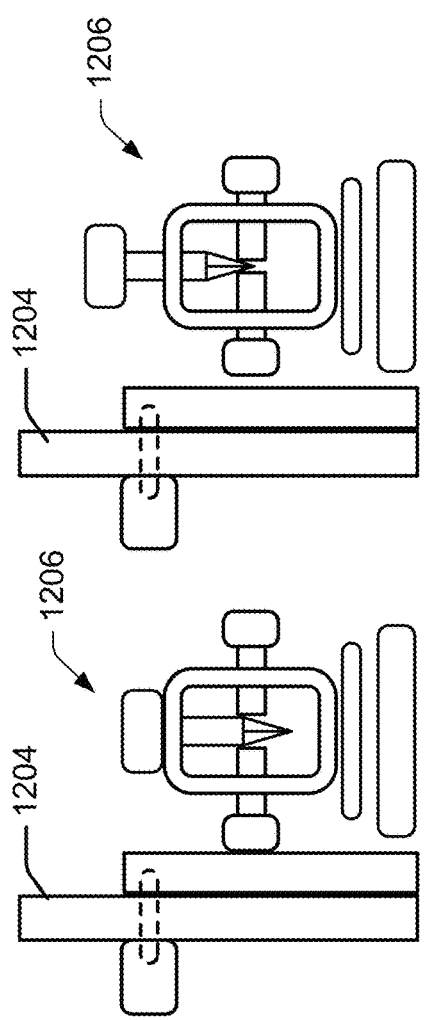
Fig. 12D
Fig. 12C
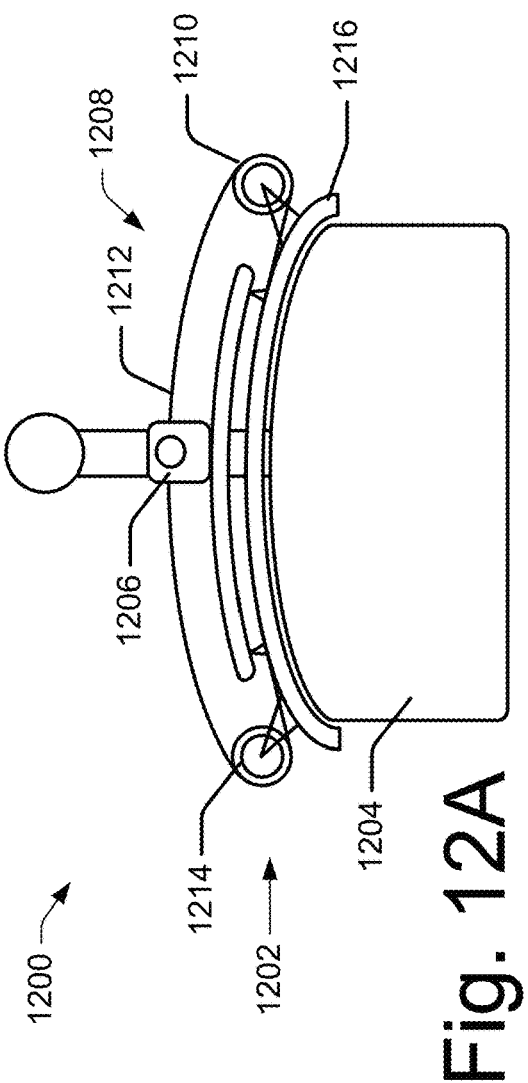
Fig. 12A

NON-INTRUSIVE FLIGHT DATA COLLECTION AND ANALYZATION WITH FLIGHT AUTOMATION

BACKGROUND

Presently, real time data is not regularly recorded on most aircraft. When it is recorded often it is not accessible to the pilot immediately and, when available, is often inaccurate and glitchy. On some aircraft, a special data cable is required to extract the data after the flight, and often this leads to few pilots utilizing this feature. Some aircraft save to a removable data storage card, but the data is not easy for a pilot to understand, interpret, or use and may require proprietary software to read. Further, current technology used to collect real time data extremely is cost prohibitive, intrusively integrated into the aircraft, and primarily on large commercial and military aircraft.

BRIEF DESCRIPTION OF THE DRAWINGS

The Detailed Description is set forth with reference to the accompanying figures. In the figures, the left-most digit(s) of a reference number identifies the figure in which the reference number first appears. The same reference numbers in different figures indicate similar or identical items.

FIGS. 12A-D show side views of an auto throttle assembly according to an embodiment of the instant disclosure.

DETAILED DESCRIPTION

Overview

Figure 1:
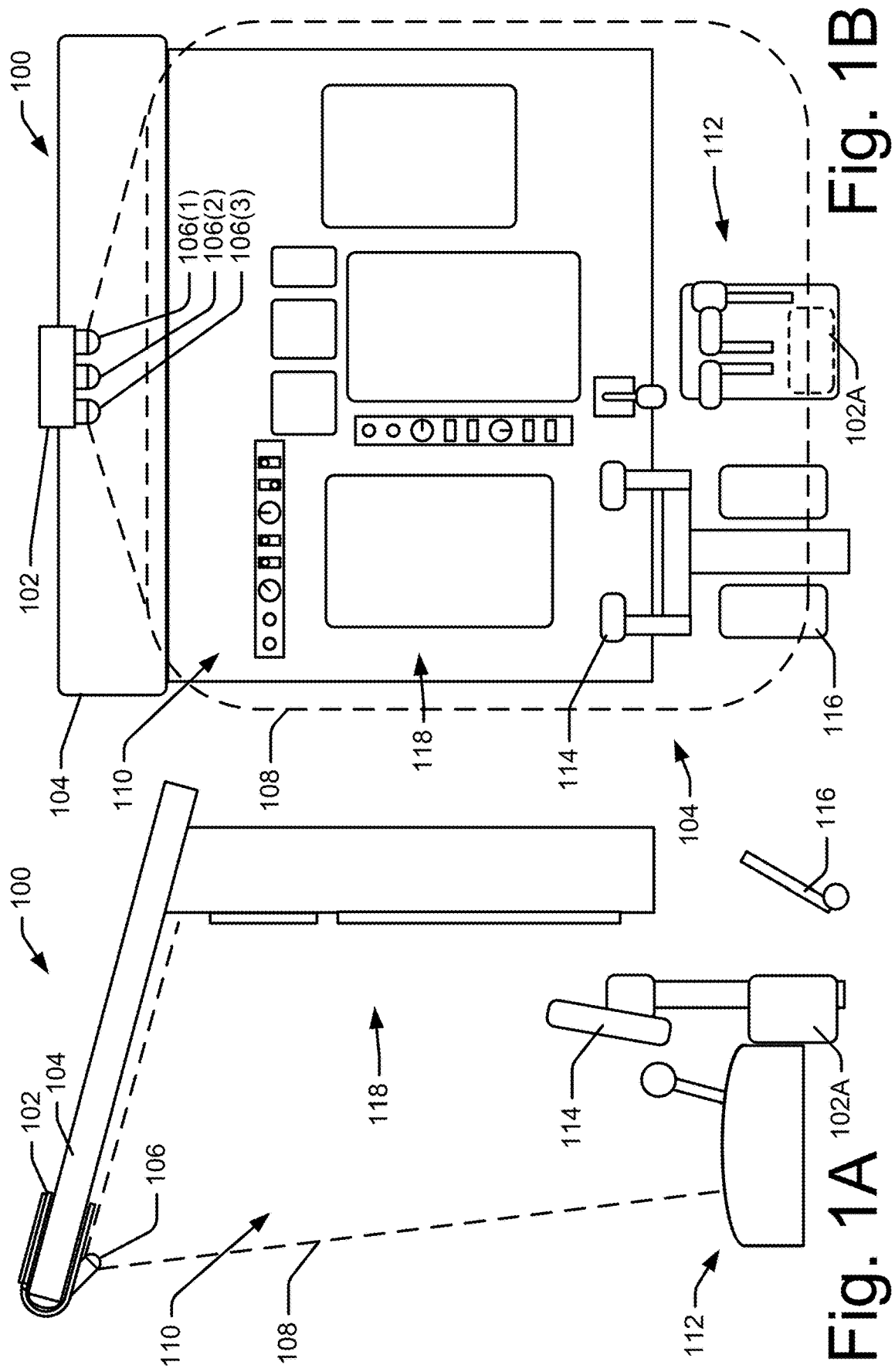
FIGS. 1A-B show an illustrative operational environment of an illustrative embodiment of a device according to an embodiment of the instant disclosure.

This disclosure describes techniques and systems for non-intrusive flight data collection and analyzation as well as automation of certain flight controls. For example, aircraft and flight data may be captured using optical isolation camera-based techniques in conjunction with intelligent analysis techniques to effect flight control, pilot awareness, and/or flight improvement, among others. Additionally, the disclosed system allows data to be collected on any aircraft without an invasive installment. Additionally, the disclosed system may be portable, lightweight, and easy to install.

An embodiment contemplates an optical isolation data collection system that requires little or no certification. It may use cameras and object recognition techniques to record data from various visible sources. The system may interpret the data, control automation features, and report the data in various formats. The system may learn and adapt as it collects data.

In an embodiment, several cameras focused on the instrument panel are mounted at strategic positions in an aircraft cockpit. The cameras automatically record pictures or videos and may convert the images into digital data which is then recorded and analyzed through a central processor. To assist in the management of the flight and to achieve desired flight results, the processor can adjust the throttles and/or other systems. An embodiment of the system provides an auto-throttle system that does not require invasive installation into the aircraft and thus may not require certification. It may reduce pilot workload by interpreting the data for the pilot. It may provide a set of data that can be interrogated in real time for the current flight or for various other applications at a later time.

For example, an illustrative technique may include system cameras collecting data, the system converting the captured images to flight data, analyzing the flight data in real time, determining action information based on the analysis, assisting the pilot by providing direction, providing a warning, and/or effecting an action, and preserving the data for further analysis.

This system enables various stake holders involved with the aircraft to obtain data that might otherwise not be available to them. For example, flight instructors and trainers, insurance companies, original equipment manufacturers (OEMs), insurance companies, sellers and purchasers of the aircraft, among others all desire and may substantially benefit from the collected data.

An illustrative embodiment of the system may include a mobile device-based application, battery powered cameras and small battery powered actuators. Each of the components are wirelessly connected through Bluetooth or another wireless signal. The cameras are clipped into the cockpit and focused on the instrument panel. The cameras continuously take pictures of the dial or analog gauges, strip tape, annunciator lights, digital numerals, normal text on flat screens or CRTs, LED or LCD lights or digits, position of needles, position of knobs, switches, or any other type of information that is normally interpreted by a pilot or human user. These images are sent to the application which uses OCR to translate the information into text or readable data for use. For each particular installation, the images are calibrated to the software. The software in the main program detects each type of input or information being gathered.

The converted images, now data, is compiled and sorted to be used to track airspeed, altitude, radio frequencies, waypoints, flap settings, fuel quantity, temperature, heading, autopilot modes, flap position, gear position, or any other information the pilot needs throughout flight. Load sensors or laser sensors on wingtips and nose measure the distance to the ground and can estimate weight and center of gravity (CG) of the aircraft. Or gauges on the gear legs allow for weight and CG. For example, a distance measuring sensor on cell phone may measure a distance to ground and from that distance, the system may determine the weight on each of the wheels.

In examples, real time data may be used throughout the flight to assist the pilot throughout the flight. In examples, this will help alleviate pilot fatigue and error.

Upon landing and the completion of the flight, the data may be uploaded to the remote servers for further analysis. This data can be used for by the OEM or other organizations for further study of the aircraft. It can be used to compare a specific aircraft with the fleet of similar aircraft or dissimilar aircraft. It can be used to compare a specific pilot with a group of pilots. It can be used to demonstrate the skill of the pilot during specific flight conditions.

In examples, the application may calibrate to the specific OEM flight parameters for the specific aircraft.

Illustrative Operational Examples

The following are some illustrative examples of operation and capabilities. While some examples are described with respect to features of jet based aircraft, other aircraft and vehicles are also contemplated as part of this disclosure.

In examples, the system may provide throttle settings. In examples, compressor speed (e.g., N1) is automatically computed based on the ram air temperature (RAT), altitude, flight phase (TO, Climb Cruise) and anti-ice mode selected and then alerts the pilot thru the interface that the current N1 setting is high, low, or correct. In examples, the system will warn the pilot visually and/or aurally to make the proper adjustment. In examples, where the auto throttle actuators are connected to the throttle levers, a correction may be made to place the throttles in the proper position.

In examples, the system may provide performance optimization for the mission. For example, different stages of the flight may be considered (e.g., pre-flight, takeoff and climb, etc). In examples, the system begins with preflight considerations and then considers flight and landing narratives. In examples, the system may check each phase of flight. For example, during the planning phase the system is checking weather and takeoff and landing distances, starting, taxi, takeoff, climb, cruise, decent, approach landing, taxi and shutdown. In examples, the system is continuously analyzing information and making corrections based on the real time data.

In examples, the system may optimize range. For example, the user/pilot selects optimize range. In examples, the system reads or receives the weight and CG of the aircraft. Based at least in part on this information, the system will provide the user/pilot instructions on how to optimize the mission. For example, the system provides instructions for the pilot to distribute or redistribute part of the load (e.g., load more aft). In examples, the system obtains the predicted winds and temperatures from the internet or flight planning program and calculates the best climb schedule and cruise altitude. In examples, the program regularly (e.g., continuously, constantly, at set time intervals, in response to triggers, etc) makes calculations and adjustments during flight and informs the pilot to make adjustments. In examples where the pilot selects angle of attack hold, then the system reads the dial gauge, translates it to a number, and adjusts the throttles to maintain that angle of attack, thus achieving the optimum range. In examples, the specific fuel consumption is calculated and presented to the pilot. In examples, the system provides the pilot suggestions and comments along the way related to the status of the aircraft, current operating environment, and/or anticipated operation environment. For example, the system may tell the pilot "your headwind just increased, an increase in airspeed of 3 knots will produce the highest specific range." Or, "you will be landing with approximately 770 lbs. assuming the wind, temperature and descent is as predicted."

Additionally or alternatively, in examples, system learns certain aspects of the aircraft (e.g., fuel flow as function of airspeed and temp). The system may start with OEM data then adapts as more flights are recorded. For example, given a 42 kt headwind at 45000 and it is ISA+5, then the system may run a script to determine best airspeed and power setting for best range etc. In examples where the auto throttle is running, then it will make the adjustments to the throttles (if option is equipped).

In examples, the system monitors and manages airspeed. In examples, the system continuously monitors the indicated airspeed and temperature and calculates true airspeed, ground speed winds and fuel flow.

Additionally or alternatively, various examples contemplate training opportunities with mentors. For example, the system may provide virtual check rides and/or virtual training assistance. For example, based at least in part on the uploaded data and analysis, the recurrent training provider can see the habits or flying style of the pilot. In examples, the recurrent trainer is able to key in on habits and procedures of each pilot and tailor training to the specific needs. This data allows the trainer to virtually see all flights made by the pilot and not just the limited training flights.

Additionally or alternatively, various examples contemplate providing data to additional systems or parties. For example, data may be provided to third parties as evidence of compliance or capabilities. For example, the data may be provided to insurance providers. In examples, a video showing an approach can be sent to the insurance company showing the competence of the pilot. In examples, the data sent to insurance company may show checklist use, compliance and habits that will help keep accidents and premium rates low. In examples, the submissions may be provided regularly. In examples, the submissions may be verified.

In examples, the system may provide assistance to a pilot in checklist compliance. In examples, the system assists in pre-flight, during flight and post flight safety checklists. For example, throughout each phase of flight, the pilot must go through a series of safety checks. Examples of the system will assist in the management of these checklists. In examples, where a step is missed or omitted the system may provide an indication to the pilot. For example, the system may tell the pilot "Please check your standby gyro switch. It seems to be in the off position." Or, "It seems that you did not cycle the thrust attenuators."

In examples, the system may provide safety enhancements and warnings. In examples, the system is constantly analyzing real time flight data. In these examples, the system is able to provide additional safety prompts to the pilot. For example "The fuel flow meter is not matching the fuel quantity. It seems to be off by 20 pph." Or, "The RAT is below 10, there seems to be visible moisture hitting the windscreen, consider anti-ice" measures." Or, "You have a battery temp master warning light on: MEMORY ITEMS ARE 1. xxx 2. xxx" Or, "The oil pressure is trending downward, please monitor" Or, "The aircraft rudder trim seems to be out to the right ½ a ball." Or, "Your oxygen level is at 1300 psi. From the chart it shows you have 20 minutes with 3 passengers. Is that correct?"

In examples, the system may provide additional information during the flight. For example, the system may provide information that is not directly related to the status or operation of the aircraft. For example, the system may provide information as a form of entertainment. For example, the system may provide aviation stories during flight. In examples, the system may provide audible information to the pilot and or passengers. For example, the system may play an audio file regarding the specifications of the landing airport. In examples, the system can educate the pilot. Additionally or alternatively, during flight, the system may educate the pilot and/or passengers. For example, the system may determine a location of the craft, for example, from a GPS signal and may cross reference the location with a historical event, landmark, or other feature in the area. The system may play a recording or provide information and/or a direction of the point of interest.

In examples, the system may monitor the health of the aircraft. For example, the system may monitor fatigue of the aircraft. In examples, accelerometers placed in the cameras or other system components (e.g., data collection and computation unit (DCCU)) detect, transmit, and/or record the g levels and occurrences. In examples, the system can calculate the quality of the flight. In examples, it determines whether a specific flight has caused abnormal wear and tear on the aircraft. In examples, upon sale of the aircraft, the system can create an accurate fatigue report or rating indicating how the aircraft was flown and the fatigue incurred throughout the life of the aircraft.

In examples, the system monitors performance and may provide reports. For example, data (e.g., raw and/or processed) is uploaded to remote servers. Additionally or alternatively, reports generated by the system may be uploaded to the remote servers.

For example, reports on usage, efficiencies, landing qualities, upload automatically to the remote servers for analysis and storage. In examples, trends are analyzed and trouble is detected before it becomes a safety issue. In examples, a full analysis of all data collected is performed upon sale of the aircraft allowing the new owner to know exactly how the aircraft has performed and flown. In examples, the system may provide a score for the aircraft. For example, the new owner sees the "score" of 89 which means the new owner knows the aircraft has been flown properly and with care. In examples, an OEM flight planning guide is installed on the system and the system is comparing the aircraft performance with the OEM and the report plots where the aircraft lies within the OEM data and other aircraft of the fleet. This data may be highly desirable to OEMs and other organizations for fleet analysis.

In examples, as soon as the plane lands, the temperature and winds along with g levels, turbulence and other information that is usually contained in pilot reports (PIREPs) for the flight are uploaded to a remote or central server and made available to other system subscribers and the NOAA. This real time data will improve flight planning for other aircraft making similar flights.

In examples, training may be improved by comparing each set of flight data to other flight profiles. In examples, the system compares each set of flight data to other flight profiles and provides an analysis, score, and/or feedback.

In examples, the system may record and upload reduced vertical separation minima or minimum (RVSM) altitude cross checks to the server. In examples, this allows the RVSM data to be available to the system as well as other aircraft connected to the system.

In examples, performance is graphically plotted during the flight to show where the flight lies on a performance graph. In examples, drag and thrust estimates are calculated during the flight and may be provided to the pilot.

While other systems may be available to capture some information during flights, they lack the capabilities of the presently disclosed system and techniques. For example, while some systems may calculate a maximum fan speed setting N1, those systems do not provide for data storage and back end analysis of the data. Additionally, those systems require attachment to the data bus of the aircraft and are severely limited in the available data and analysis they can provide to the flight crew. Additionally, other systems that offer additional sophistication, for example, the FADEC system, are extremely expensive and require integration into the aircraft.

Additionally, for example, the Safe Flight N1 computer uses data from the aircraft data bus to calculate the max N1 setting and has a small display. As the SafeFlight N1 computer, provides similar but limited data analysis, it does not allow for data storage and back end analysis and is attached to the data bus on the aircraft and is a very small portion of the data that the system calculates and provides to the flight crew. The FADEC system, while sophisticated, is cost prohibitive to install on smaller aircraft.

In examples, the system provides some or all of following features or capabilities: Climb speed schedule, data logging, engine overspeed warnings, in ear audio insights, N1 calculations, TOLD calculations, update to VA server, weather data, weather interpretation, data reporting, data comparison to book values, data comparison to fleet values, de-icing/ice prevention suggestions, engine trend monitoring, Flight Plan deviation insight for weather, flight planning software integration/compatibility/connectivity (e.g., Foreflight, My Flight Book, Flgihtpin.com), graphical representation on climb schedule, graphical representation on cruise table, NOAA temperature wind turbulence reporting thru ADSB, aircraft performance plotting, flight report card, RVSM recording, sensor trend monitoring, aircraft maintenance reminder, checklist management, switch and knob insights, compare to FADEC data, emergency annunciator monitoring, fatigue monitoring, graphical representation on L/D, graphical representation on Thrust chart, history lessons based on location, insurance reporting, pre-purchase report, training supplement, glide path hold, GS SPRING hold, IAS hold, N1 Hold, TAS hold, TAS SPRING hold, VS hold, AOA Hold, and/or fuel flow hold.

Additionally, an embodiment contemplates a user's interaction with the system, for example, through a mobile device interface. For example, a user, John, sits in an office and opens the mobile application, and may have the following illustrative interaction with the mobile application:

(1) Hello John, good morning.
(2) What do you want to do?
(3) Plan a flight?
(4) Ok, so when do you want to go and where are you going? Should I read a flight plan that you already built on [an otherwise available flight planning] app? Ok, let me take a look. Ok, I got it off the web. You want to go to LA with 4 people. Let's work out the details. Let's go through our list of items.
   (a) Weather Analysis
      (i) METAR
         1. Resource: https://www.wikihow.com/Read-an-Aviation-Routine-Weather-Report-(METAR)
         2. Example: (KCOE 181956Z AUTO 15010KT 10SM SCT015 BKN022 BKN027 07/05 A2966 RMK AO2 RAE10 SLP068 P0000 T00720050
         3. Time
         4. Wind
         5. Visibility
         6. Present Weather
         7. Sky condition
         8. Temp
         9. Dewpoint
         10. Pressure
         11. Remarks
      (ii) TAF here and there
         1. Forecast for: KCOE (COEUR D'ALENE, ID, US) Text: KCOE 181739Z 1818/1918 18011KT P6SM-RA OVC015 WS 020/21040KT Forecast period: 1800 to 2000 UTC 18 Dec. 2018 Forecast type: FROM: standard forecast or significant change Winds: from the S (180 degrees) at 13 MPH (11 knots; 5.7 m/s) Visibility: 6 or more miles 10+ km) Ceiling: 1500 feet AGL Clouds: overcast cloud deck at 1500 feet AGL Wind Shear: at 2000 feet (610 m) AGL, from the SSW (210 degrees) at 46 MPH (40 knots) Weather: −RA (light rain)

2. Do you need an alternate airport?
      a. FAR 91.169 states that IFR flight plans must include an alternate airport unless the weather is at least 2000 ft ceiling and 3 miles visibility, from one hour before to one hour afterwards (1-2-3 rule).... Ceiling 600 feet and visibility 2 statute miles. (B) For a non-precision approach procedure.
      (iii) Prevailing conditions
      (iv) Runway conditions/contamination
         1. Wet, snow, slush, packed ice etc.
   (b) Airport Limitations
      (i) Obstacle clearance
      (ii) Departure procedures
   (c) W&B
      (i) Calculated from stored data based and payload and fuel
      (ii) Measured from our cool new system we are working on
   (d) Takeoff
      (i) Allowed Takeoff weight from WAT Charts (Weight/Altitude/Temperature)
      (ii) Which Runway to use? Consider wind, Gradient, Length, obstacles
      (iii) Anti-Ice Settings (visible moisture and less than 10 RAT)
      (iv) CG affect trim? Aft CG cheat nose down, Fwd CG cheat nose up
      (v) Runway Distance required
         1. Accelerate go distance
         2. Accelerate stop distance
         3. Flaps 0
         4. Flaps 15
      (vi) Climb out emergency analysis
         1. Flaps 0 or Flaps 15
         2. 1st seg
         3. 2nd Seg
         4. 3rd Segment
         5. TCI
         6. V speeds from tables
   (e) Loading up Airplane
   (f) Preflight
   (g) Starting up
   (h) Clearance Delivery
   (i) Taxi
   (j) Clearance
   (k) Climb
   (l) Cruise
   (m) Descent
   (n) Approach
   (o) Landing
   (p) Taxi
   (q) Shutdown
(5) Enter Data?
(6) Edit Profile?
(7) Download data?
(8) Update App?

Additionally or alternatively, an embodiment may utilize additional dialog, a subset of the above noted factors, or combinations thereof.

Illustrative Process Flow

The present disclosure contemplates various processes and techniques. For example, a server, for example, a web-based server, may have fleet data and specific airplane data ready to upload to customer phone app. It monitors the internet for current weather, latest airport databases that have runway and other important information. It monitors Airplane Flight Manual (AFM) and Operator's Manual (OM) revision status. It updates databases for the phone and computer to stay current. It maintains and updates fleet performance database as well as Tail Number specific database. It monitors customers flight planning software to recognize upcoming flight and to customize performance parameters.

In examples, a user interacts with the system to plan a flight. For example, the mobile interface may retrieve and/or supply weather and airport data from internet and server and helps customer flight plan. Phone app is used to set up the computer initially and monitor software status.

Additionally or alternatively, the system provides preflight inspection tips and interactions are offered based on weather conditions and maintenance items previously identified. For example, the mobile device may display such information and/or recommendations.

In examples, during a flight, a Data Collection and Computation Unit ("DCCU") may have or interact with sensors and a processor to perform calculations on data received from phone and onboard sensors. Additionally or alternatively, in examples, the DCCU may comprise or interact with a camera. In this example, the camera may capture an image of one or more displays or indicators in the aircraft. The system may identify a reference point associated with the captured image of the display or indicator. The system may convert and/or normalize the image. The system may perform a process to extract data from the image, for example, an optical character recognition (OCR) process may be performed. In examples, the system captures one or more data points from the image. In examples, the system applies machine learning to determine what data should be extracted and reported/used in the system. Additionally or alternatively, some or all of the extracted data may be reported to the DCCU for processing.

Additionally or alternatively, in examples, the DCCU comprises or interacts with a global positioning system (GPS). In this example, the GPS may obtain a GPS fix. The system may identify and/or calculate for speed, heading and/or altitude of the aircraft. Additionally or alternatively, some or all of the GPS related data may be reported to DCCU for processing.

Additionally or alternatively, in examples, the DCCU comprises or interacts with a barometer and/or temperature measuring device. In this example, the sensor may detect the pressure and temperature. The system may read the pressure and temperature data and determine an altitude and/or temperature at the location of the aircraft. Additionally or alternatively, some or all of the altitude and/or temperature related data may be reported to DCCU for processing.

Additionally or alternatively, in examples, the DCCU comprises or interacts with an Inertial Measurement Unit (IMU). In this example, the IMU may comprise a gyroscope, an accelerometer, a magnetometer, or combinations thereof, and may detect inertial aspects of the aircraft. The system may read the data and some or all of the related data may be reported to DCCU for processing.

In examples, the DCCU receives some or all of the data discussed above and may process the data. For example, the received data may be parsed and concatenated into a database, data stream, text file, csv file, or sentence.

In examples, the DCCU analyzes the data. For example, the DCCU may use onboard AFM and/or OM data, weather data, airport databases, among others. Additionally or alternatively, the onboard data and received data may be combined and in some cases stored.

In examples, the DCCU determines a subset of the data to display. For example, the subset of data may be determined based on the status and location of the aircraft. For example, during startup, the engine temperature data is displayed, while in cruise the air temperature may be displayed.

In examples, the DCCU displays the subset of data on a display. For example, the DCCU may be connected to a display and/or the DCCU may send data to a remote device, for example, a mobile device. Additionally or alternatively, the connection to the display or to the mobile device may be wired or wireless. Additionally or alternatively, the display may show the data to provide feedback to the user, for example, a pilot, a trainer, an observer, among others.

Additionally or alternatively, in examples, the DCCU determines a throttle setting based at least in part on a portion of the data. In this case, a command may be sent to a throttle control to adjust the throttle consistent with determined throttle setting. For example, the command may be communicated through a wired and/or wireless connection. In examples, the command may be communicated through a mechanical system for example, a cable.

Additionally or alternatively, in examples the DCCU communicate some or all of the stored data to a location away from the aircraft. For example, the DCCU sends the data to the mobile device and the mobile device may then communicate the data to a server. For example, the mobile device may connect through a wireless communication system to upload the data to a remote server.

Additionally or alternatively, in examples, the data is further processed. For example, a server receives the data, for example from the mobile device. Additionally or alternatively, the system may process the data to evaluate the flight or flights. For example, the system compiles the data and upload it into a fleet databased. Additionally or alternatively, the system generates internal and/or external reports, for example, maintenance items, training advice, performance insights, fleet summaries and comparisons, insurance suggestions, etc.

Illustrative Operational Environment

FIGS. 1A-B show an illustrative operational environment 100. For example, operation environment 100 may comprise a cockpit or flight deck of an aircraft. Additionally or alternatively, the operational environment may comprise any location where an operator may interact with controls and/or instrument readouts of any vehicle or complex machine. FIGS. 1A-B also show an illustrative example of a data collection and computation unit (DCCU) 102. In examples, the DCCU 102 is removably mounted in the flight deck, for example, by attaching it to a glare shield 104. In examples, the DCCU 102 may be communicatively coupled to one or more optical sensors 106. The optical sensors 106 may have a field of view 108 and may be generally be directed to view one or more portions of the flight decks instrument readouts and/or control inputs 110. The flight deck instruments readouts and control inputs 110 may include throttles 112, yokes 114, rudder pedals 116, and/or instrument panel 118.

In examples, the optical sensors 106 are communicatively coupled to the DCCU 102 through a wired or wireless connection and may be locally attached or remotely located from the DCCU 102. Additionally or alternatively, the one or more optical sensors 106 may be directed to specific portions of the flight deck to observe certain instrument readouts or controls. Additionally or alternatively, the one or more optical sensors 106 may have separate field of views 108. Various embodiments contemplate that the separate field of views 108 may be overlapping to some extent. For example, a first field of view may overlap with a second field of view to provide redundancy for gathering data from a specific instrument if, for example, the first optical sensor encountered an error or failure or was temporarily blocked, for example, by a pilot, manual, or other object. Additionally or alternatively, the overlapping filed of views may allow for a more accurate reading of one or more instruments, for example, by providing a second reading angle that may allow for triangulation of the instrument. For example, a throttle location, flap location, dial setting, needle position, or combinations thereof.

Additionally or alternatively, the DCCU 102 may be located at a single location or may be distributed within the aircraft. For example, FIG. 1A shows DCCU 102A as the location of a portion of DCCU 102, for example, one or more processors, media storage, sensors, among others. Additionally or alternatively, DCCU 102A may be the primary location of the DCCU functionality while the location on the glare shield 104 may merely support the affixation of optical sensors 106, power generation (for example, batteries, solar panels, fuel cells), communication equipment (for example, antennas, transmitters, receivers, among others), or combinations thereof.

Figure 2:
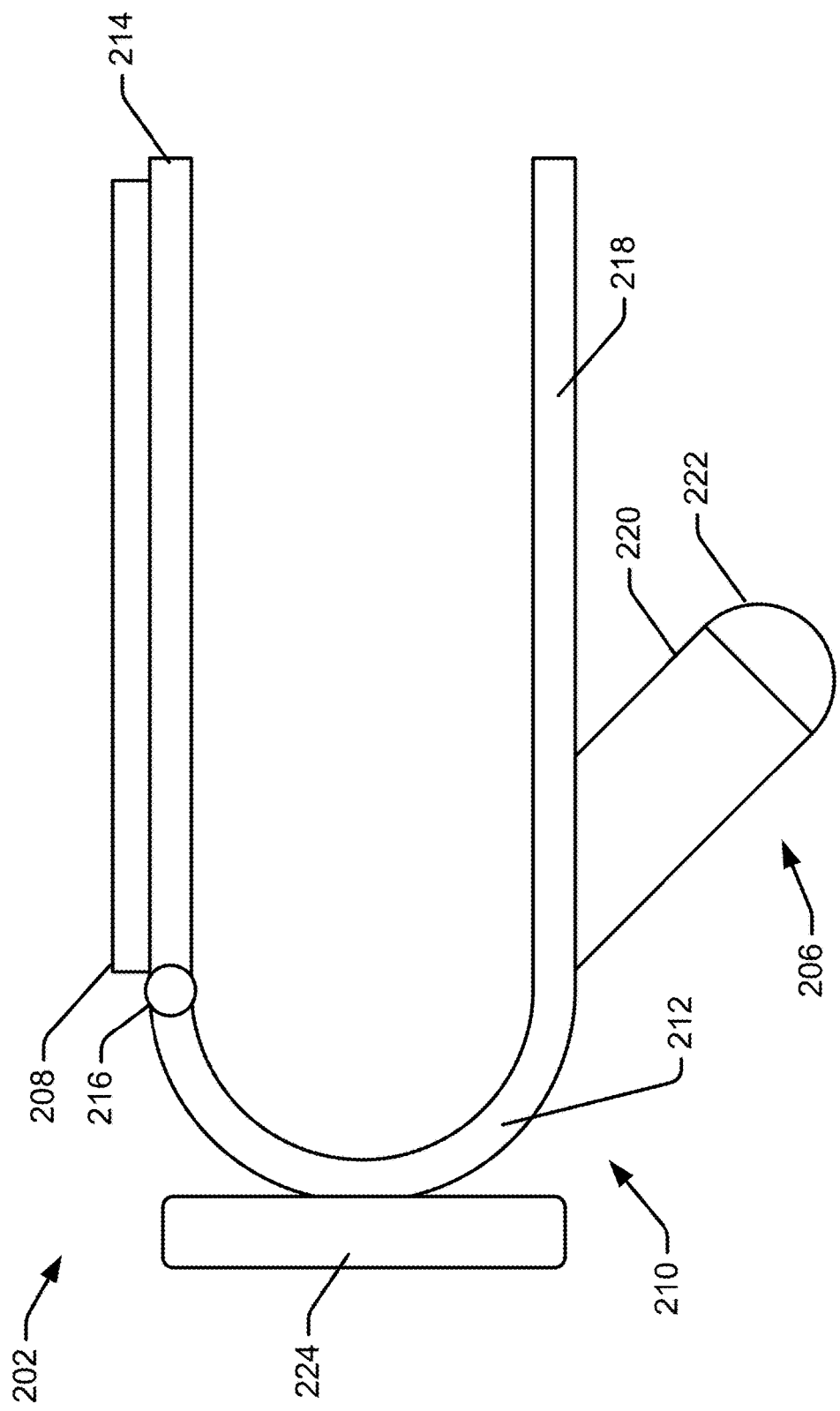
FIG. 2 shows a side view of the device of FIGS. 1A-B.

FIG. 2 shows an illustrative DCCU 202. The DCCU 202 may be similar to DCCU 102 shown in FIGS. 1A-B. For example, DCCU 202 may include optical sensors 206 and power generation (for example, batteries, solar panels, fuel cells) 208. An embodiment contemplates that the DCCU 202 further includes a frame 210. The frame 210 may comprise a lower portion 212 coupled to an upper portion 214 through a biasing connector 216. For example, biasing connector 216 may comprise a hinge with a spring biasing the upper portion 214 towards the lower portion 212 to create a clamping effect to, for example, assist in affixing the DCCU 202 to the aircraft, for example, by clamping onto a glare shield similar to the glare shield 104 shown in FIGS. 1A-B.

Additionally, FIG. 2 shows the power generation 208, for example, a solar panel, coupled to the upper portion 214. In this configuration, while DCCU 202 is coupled to a glare shield, the solar panel may be in a position to harvest solar energy to power some or all of the DCCU 202 system. Additionally or alternatively, examples of the DCCU 202 continue to receive power from the solar panel while the aircraft is not operating and may store the generated energy in an energy storage system, for example, one or more batteries.

Additionally or alternatively, the lower portion 212 may include a mounting portion 218. For example, mounting portion 218 may provide a surface for securing mounting optical sensors 206. In examples, an optical sensor 206 includes a base portion 220 and an optical portion 222. In examples, the base portion 220 is adjustable to direct the optical portion 222 to a desired portion of the aircraft. Additionally or alternatively, in examples, the base portion 220 may be non-adjustable to preserve the optical portion 222 direction with respect to the DCCU 202 and/or other optical portions 222. In examples, the DCCU 202 includes a combination of base portions 220 where one or more are non-adjustable and one or more are adjustable.

Additionally or alternatively, in examples, a display 224 is coupled to DCCU 202. For example, the display 224 is configured to display selected data from the DCCU 202. For example, the display 224 may display data collected from the aircraft, collected from a remote source, modified data, filtered data, analyzed data, among others, or combinations thereof. In examples, the system applies techniques to determine what information to display. For example, the display may be based on a temporal factor, for example, a recent entry, a recent measurement, a current warning, a recommendation (e.g., a setting adjustment (e.g., throttle, flaps, heading, among others), a user action (e.g., change altitude), among others), or combinations thereof. Additionally or alternatively the display may be based on a heuristic priority, for example, an unresolved warning, an error, a loss of connection to sensors, or combinations thereof, among others.

Additionally or alternatively, in examples, the system comprises multiple communication channels. For example, the DCCU 202 may include an audible communication system, a tactile communication system, or combinations thereof. For example, the DCCU 202 may include a speaker that may emit informational sounds, for example, warnings, indications that certain or desired thresholds area met (e.g., reaching a desired altitude, airspeed, heading, of combinations thereof), among others. Additionally or alternatively, the DCCU 202 may include a tactile communication system, for example, a shaker, a buzzer, among others.

Illustrative Techniques

Figure 3:
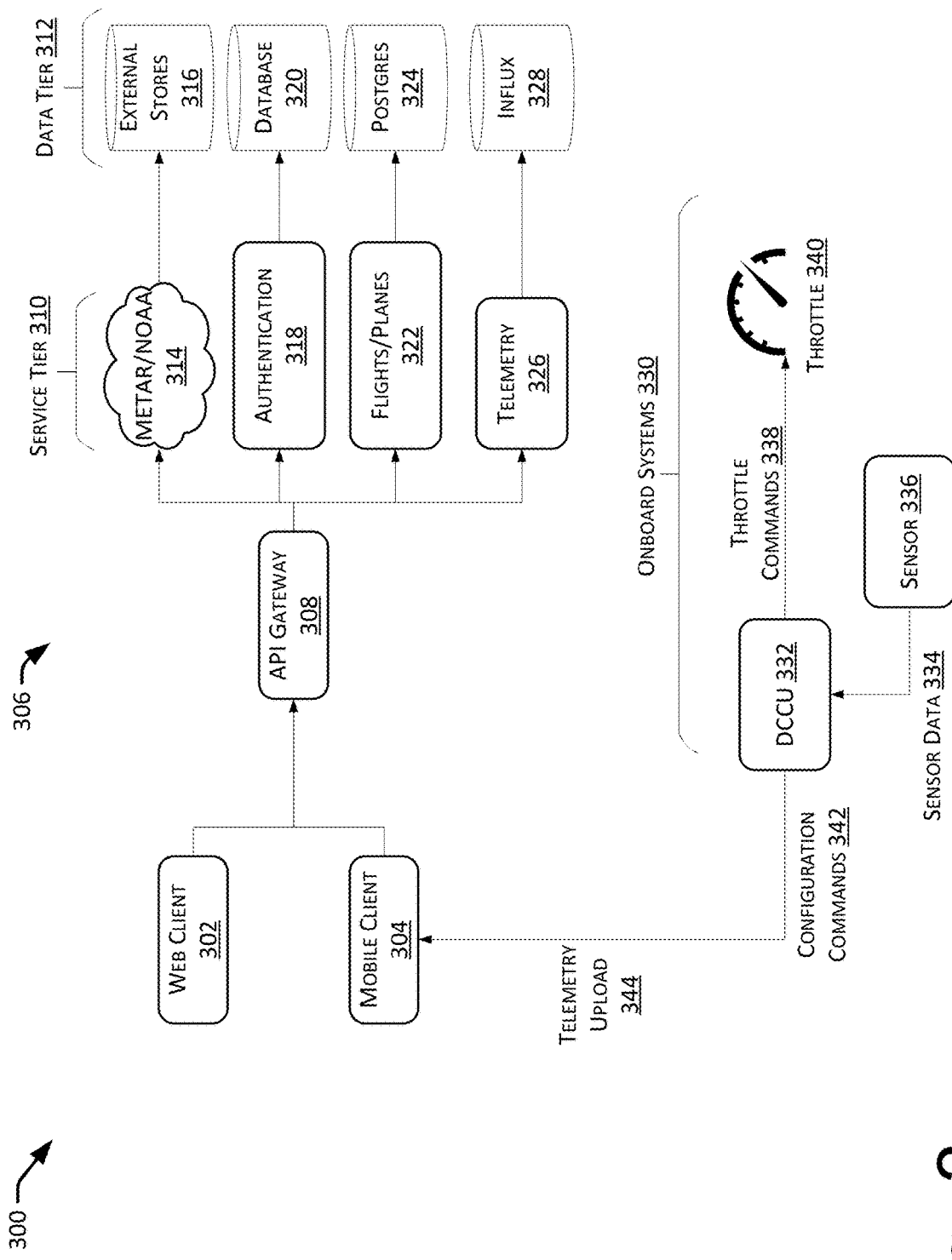
FIGS. 3-11 show illustrative schematics of system architectures and operations of illustrative embodiments of the instant disclosure.

FIG. 3 shows a schematic of an illustrative architecture 300. For example, architecture 300 may include a web client 302 that may be in communication with a mobile client 304 on a mobile device. Additionally or alternatively the web client 302 and/or the mobile client 304 may be able to communicate with a remote server 306, for example, through an application programming interface (API) gateway 308. The remote server 306 may comprise a service tier 310 and/or a data tier 312. Various embodiments contemplate that each service on the service tier 310 may be coupled to an appropriate data storage/aggregation source. For example, the service tier 310 may include data gathering and management services, for example, weather services 314 (e.g., meteorological aerodrome reports (METAR) and/or National Oceanic and Atmospheric Administration (NOAA) weather reports and databases). The data procured from the weather services 314 may be located on external data 316 bases or may be pulled on an as requested basis. Additionally or alternatively, an authentication service 318 may be available to authenticate a user and may be coupled and access a database 320, for example, MongoDB to authenticate a user. Additionally or alternatively, various examples include an aircraft and flight recording service 322, that may be connected to a database 324, for example, PostgreSQL. Additionally or alternatively, various embodiments contemplate a telemetry service 326 that may allow recording and accessing telemetry data and may be connected to a database 328, for example, InfluxDB.

FIG. 3 also shows onboard systems 330. For example, the onboard system 330 may be connected to a mobile device or through another connection to access the service tiers. For example, the onboard systems 330 may include a DCCU 332 or DCCU brain that may collect data 334 from onboard sensors 336, determine and/or relay throttle commands 338 to a throttle 340, and may receive configuration commands 342 or information from the service tier, for example through the mobile device. Additionally or alternatively, the DCCU 332 brain may also upload recorded information 344 from the flight, for example, the telemetry, to the remote server.

Figure 4:
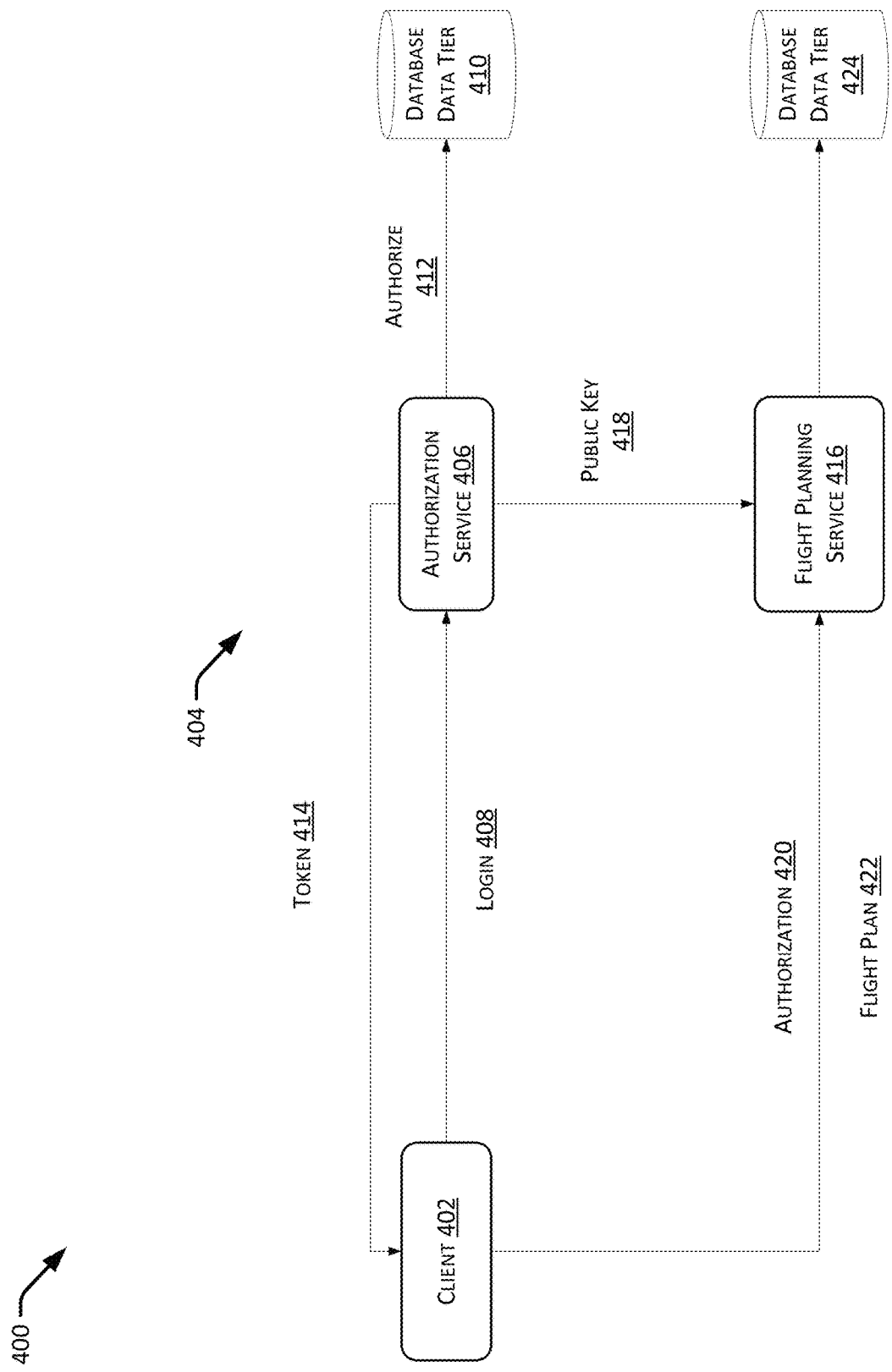

FIG. 4 shows a schematic of an illustrative authentication architecture 400. For example, architecture 400 may include a client 402 that may attempt to communicate with a remote server 404. Various examples contemplate that the client 402 may communicate with an authentication service 406 and pass client or user login information 408. The authentication service 406 may compare the login information 408 to authorization information stored in the data tier, for example, in a database 410, and if authorized 412 supply the client with an authorized token 414, for example a JWT token. The client may then use the authorized token 414 to communicate with other services on the remote server, for example, by interacting with the flight planning service 416. The authentication service 406 may provide a public key 418 associated with the client 402 to enable secure communication through the authorization 420 from the service to the client 402 and vice versa. In examples, the client can provide and/or access data, for example, flight plan 422 on database 424 of the server.

Figure 5:
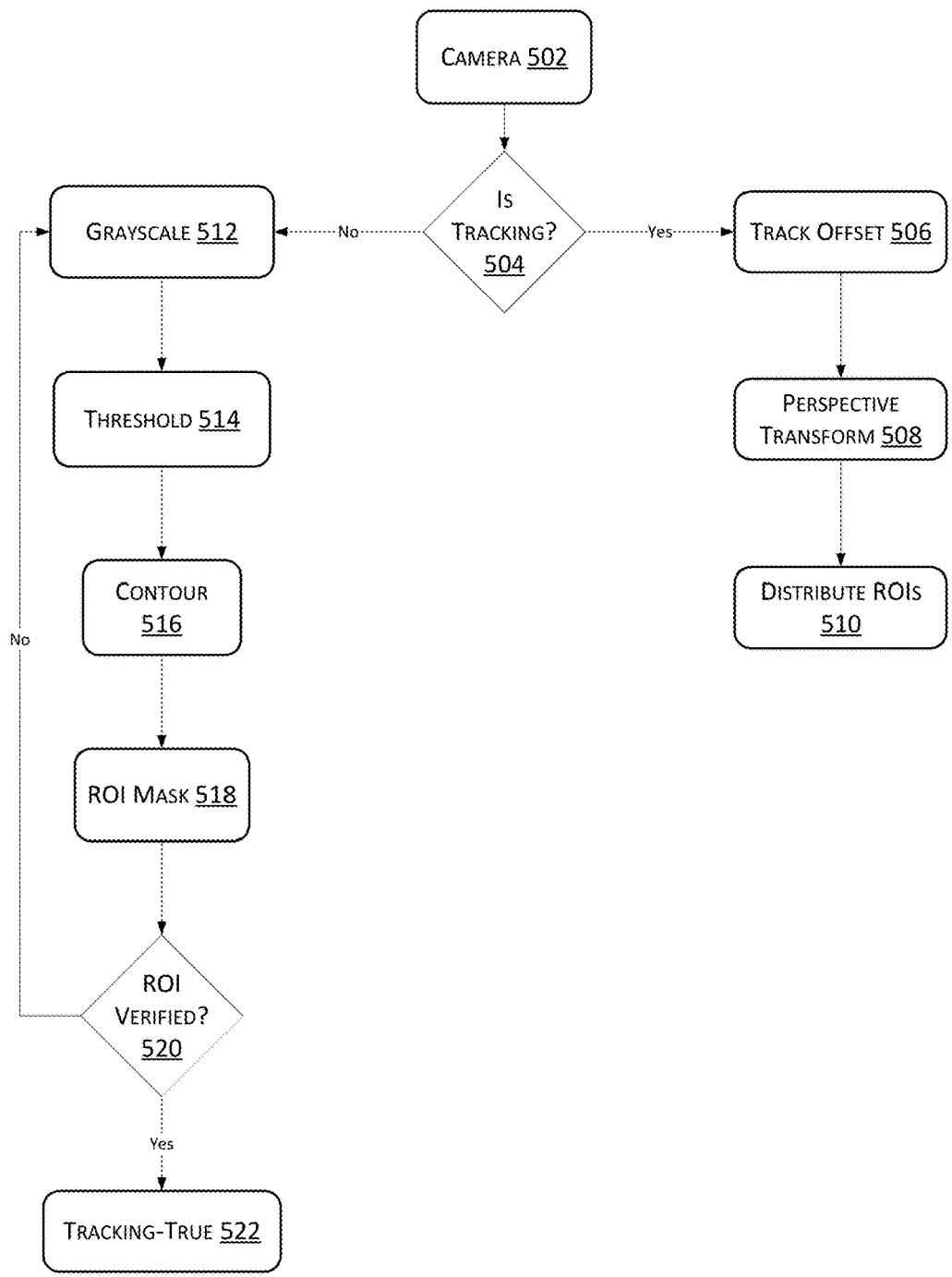

FIG. 5 shows a schematic of an illustrative method 500 of tracking regions of interest. For example, FIG. 5 shows an illustrative sensor 502, for example an optical sensor, for example, a camera. The sensor 502 may capture an image and provide it to the system. The system may determine at 504 whether the region of interest is tracking. If yes, a tracking offset 506 may be applied. If necessary, a perspective transformation 508 may be applied to the image, and the region of interest may be distributed or returned 510. If the region of interest is not tracking, then the system may apply a greyscale 512 to the image, and apply a threshold filter 514, a contour filter 516, a region of interest mask 518, for combinations thereof to verify the region of interest at 520. If the region of interest is verified, then the region of interest tracking is set to true 522. If the region of interest is not verified, then the system may revert to the gray scaling image at 512 and apply additional or different filters.

Figure 6:
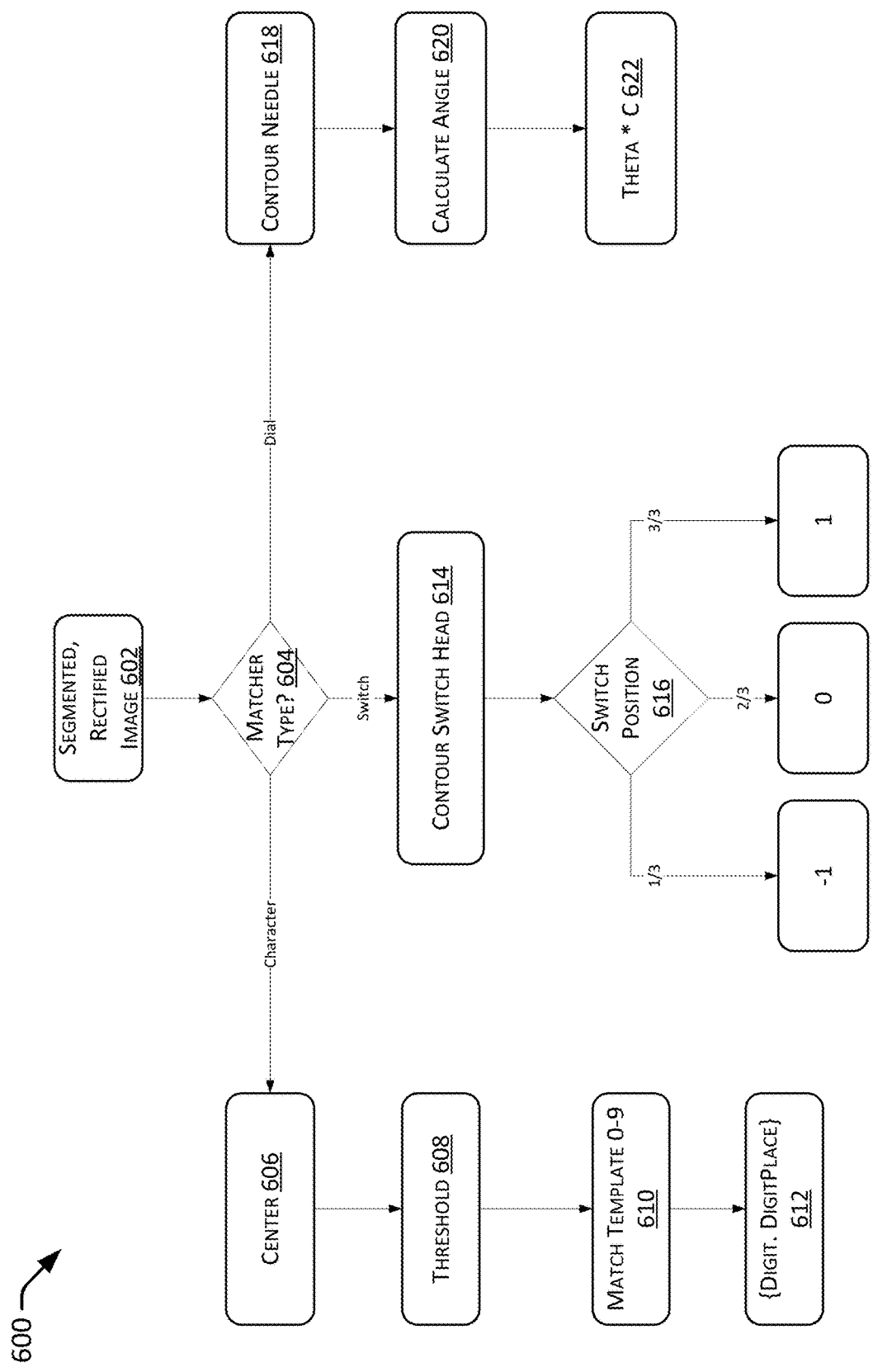

FIG. 6 shows a schematic of an illustrative feature extraction method 600. For example, the system may receive an image 602, for example, a segmented and/or rectified image. For example, the image may be a portion of or similar to the images processed through a method similar to that discussed with respect FIG. 5. In this process, the image segment may be identified as matching a type of indictor and/or control at 604. For example, the image segment may show a switch, a dial, and/or one or more characters. For example, if one or more characters are identified, the system may center the characters at 606, may apply a threshold filter 608, and may compare the characters to a match template 610, for example, identifying a digit 0-9. If identified, the digit, and, if appropriate, the digit place may be returned at 612. Additionally or alternatively, if a switch is identified, then the system may identify the contour of the switch head at 614 and may identify the switch position at 616. For example, a switch may have three positions, where a value of −1 may be returned if the switch is in the first position, a 0 may be returned if the switch is identified as being in the second position, and a 1 may be returned if the switch is identified as being in the third position. Additionally or alternatively, if a dial is identified, the contour of the needle may be identified at 618 and the system may determine an angle of the needle with respect to the dial at 620. The determined angle may be returned at 622. In examples, the angle may be multiplied by a constant to convert the observed angle of the dial from the system to the angle the indicator would indicate to a user or pilot.

Figure 7:
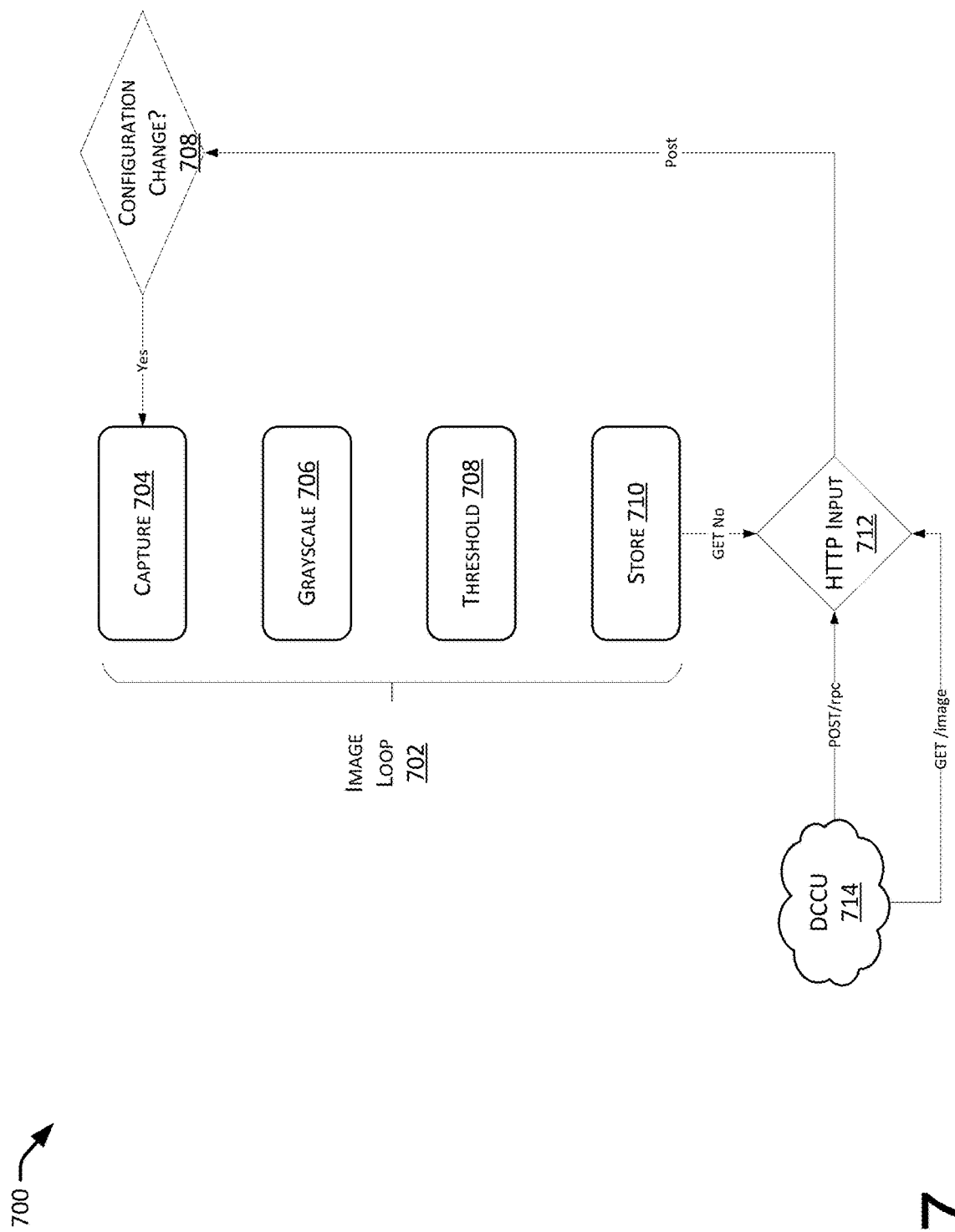

FIG. 7 shows a schematic of an illustrative image capture process 700 based on a configuration and/or a configuration change. For example, depending on whether a configuration is changed, the system may run an image capture loop 702 where, for example, an image is captured 704, a grayscale conversion 706 is applied, a threshold filter 708 is applied, and the image is stored 710. In examples, the system provides the image, for example, at 712, for example, through an HTTP service. In examples, the system includes the DCCU 714 may be local or remote. In examples the DCCU 714 may cause the system to post or get an image. In examples, the system posts the image. In examples, after the image is posted, the system checks for a configuration change at 716. In examples, where a configuration change is detected, the system returns to the image loop 702. In examples, the system is configured to enter the image loop 702 based on a time since a last loop, a change detected in another system, or other events.

Figure 8:
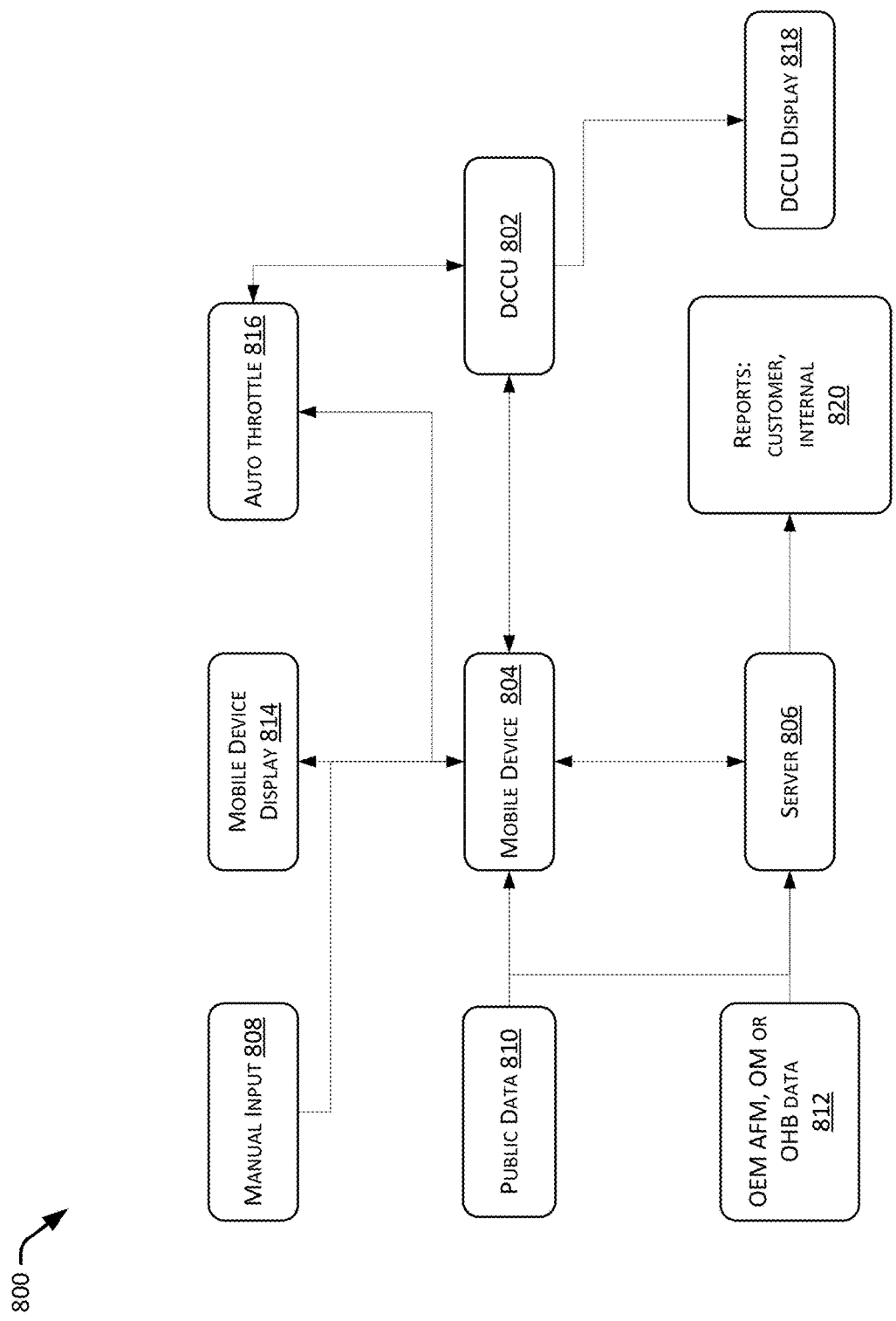

FIG. 8 shows a schematic of an illustrative system 800. For example, FIG. 8 shows a DCCU 802 that may communicate with a mobile device 804 and a server 806. Here, the mobile device 804 may receive information from multiple sources. For example, a user, for example, a pilot, may manually input information 808, for example desired flight or aircraft information. Additionally or alternatively, the mobile device 804 may interact with other data sources, for example, metrological and/or airport information 810 (e.g., atmospheric conditions, METAR, TAF, airport information, etc.), as well as aircraft operational information 812 (e.g., takeoff performance, landing performance, cruise performance, limitations, etc.). Additionally or alternatively, the mobile device 804 may provide a display 814 and display desired portions of the data. Additionally or alternatively, the server may interact with one or more of the other databases and may provide the information to the mobile device 804. Additionally or alternatively, the server 806 may store information gathered from the mobile device 804 including, but not limited to data entered by the user, data captured during a flight by the mobile device or transferred to the mobile device from the DCCU 802.

Additionally or alternatively, the mobile device and or the DCCU 802 may interact with an auto throttle 816 or other actuator. For example, the DCCU 802 and/or the mobile device 804 may provide a throttle setting or command to the auto throttle 816 to cause the auto throttle 816 to move to the commanded position or setting. Additionally or alternatively, the auto throttle 816 may provide data back to the DCCU 802 and/or the mobile device 804 confirming the command and/or showing the throttle position and/or setting. In examples, the system may output data, for example, through the mobile device display 814, the DCCU display 818, or through reports 820. In examples, the reports may be provided to the pilot or to third parties (e.g., insurance providers, prospective buyers/investors, investigators, etc.).

Figure 9:
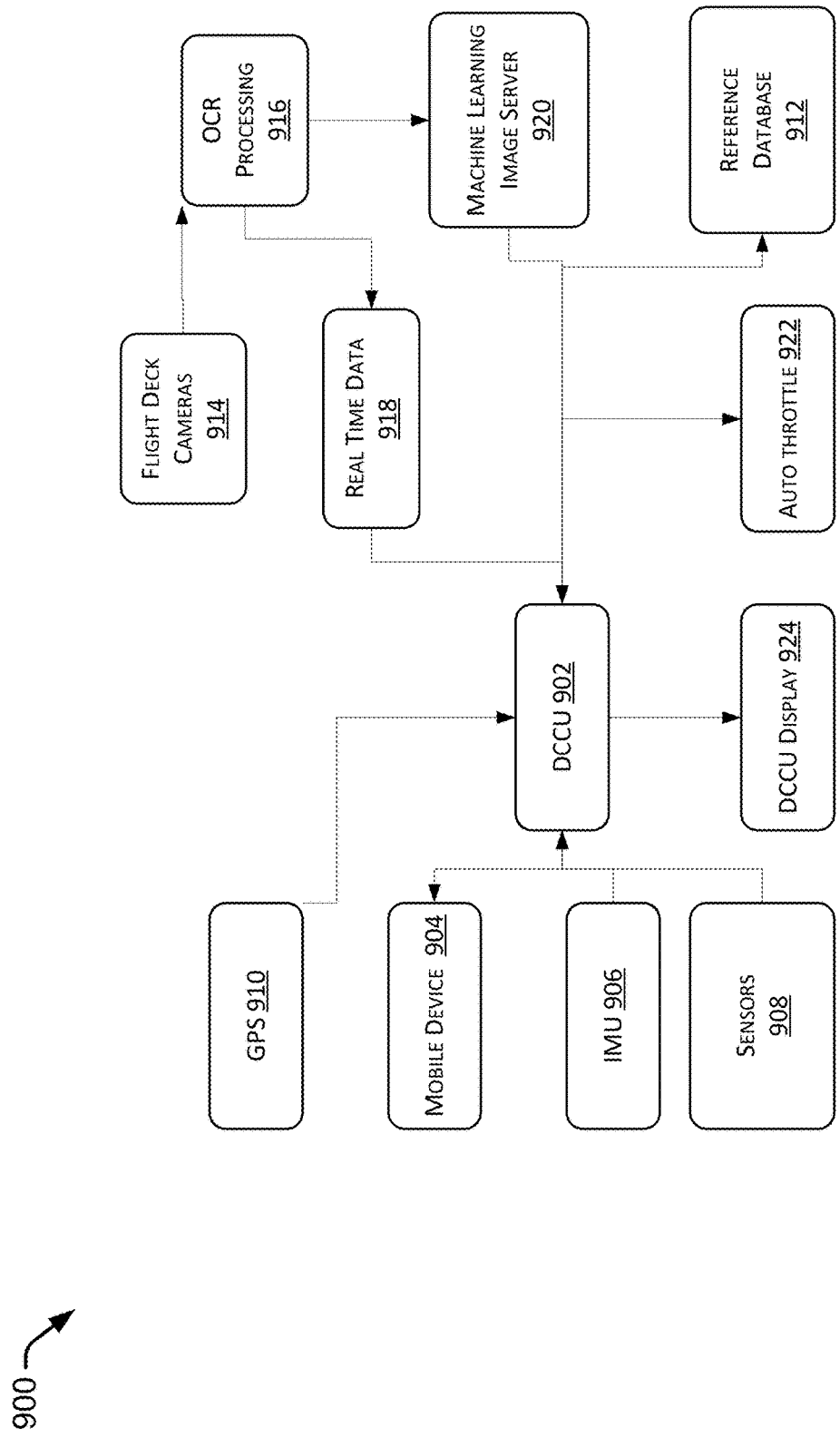

FIG. 9 shows a schematic of an illustrative system 900 with an illustrative data collection and computation unit (DCCU) 902. For example, the DCCU 902 may include a DCCU processor that may receive data from a variety of sources. For example, the DCCU 902 may receive data from a mobile device 904, an inertial measurement unit (IMU) 906, sensors 908 (e.g., a barometer, a thermometer), a global positioning system (GPS) 910, reference data 912, and/or data collected from optical sensors in the aircraft. For example, the aircraft flight deck may have optical sensors 914 monitoring indicators and/or controls, for example, on the instrument panel. Those images may be processed, for example, through optical character recognition systems 916. The systems may extract data and may provide real time data 918 to the DCCU 902. Additionally or alternatively, the extracted data may be further processed, for example, through a machine learning system 920 to further extract information.

Additionally or alternatively, various embodiments contemplate that the DCCU 902 may provide information as well. For example, the DCCU 902 may provide information to the mobile device 904, the reference databases 912, an auto throttle system 922, and/or a DCCU display 924.

Figure 10:
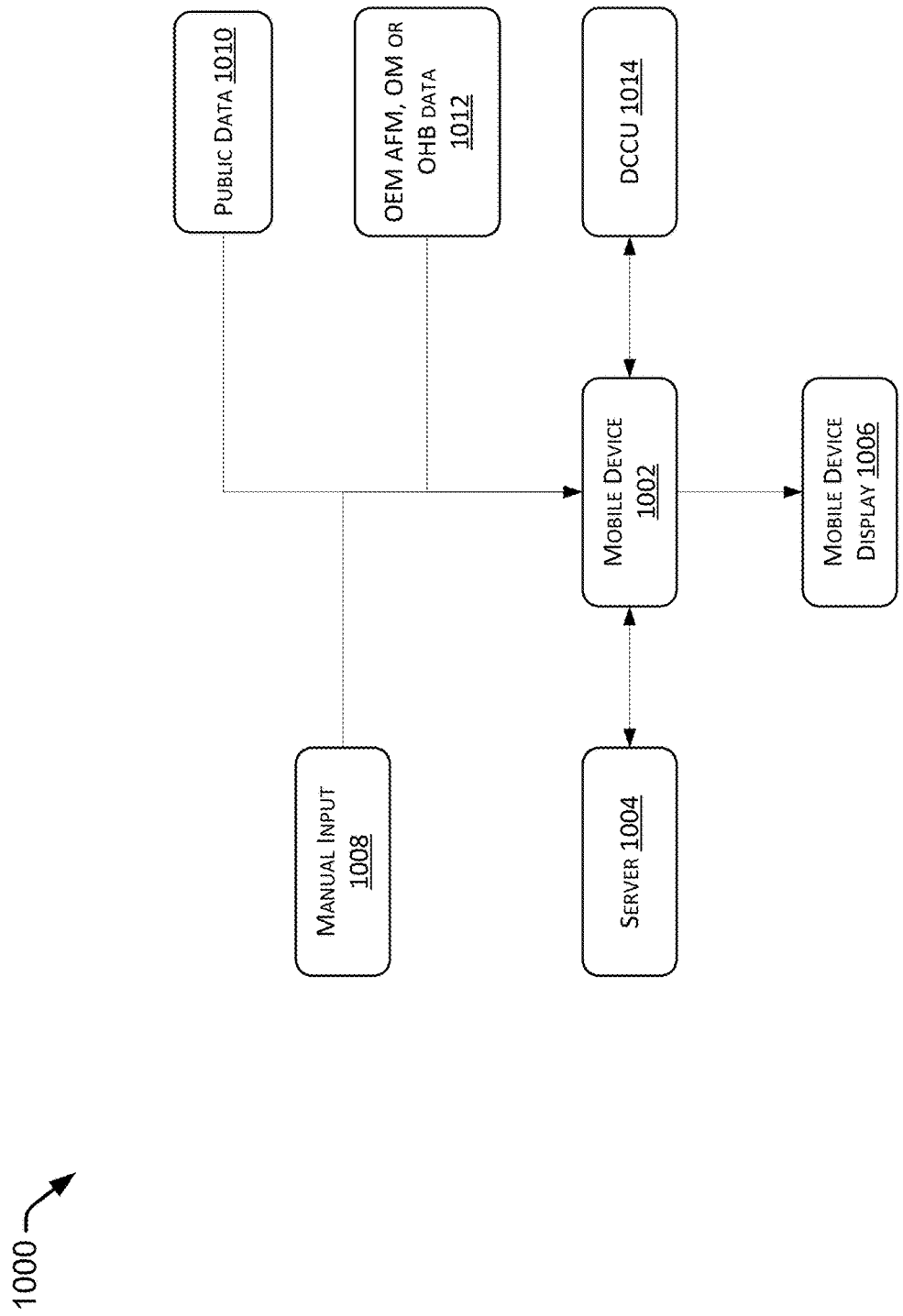

FIG. 10 shows a schematic of an illustrative system 1000 with an illustrative mobile device 1002. For example, the mobile device 1002 may operate various applications and may receive and to provide information to various sources. For example, the mobile device 1002, for example, a mobile phone, a tablet, or other computing device, may record and/or store flight data, and may upload the data to a remote server 1004. In examples, the mobile device 1002 may purge some or all of the stored data after a confirmation from the remote server 1004, a set period of time, or combinations thereof. Additionally or alternatively, the mobile device 1002 may display selected data in various forms, for example, graphs, charts, raw data, customized data, formatted data, or combinations thereof among others on a device display 1006.

Additionally or alternatively, the mobile device may receive information from a user 1008, for example, a pilot, indicating flight and or aircraft configuration information (e.g., weight and balance information at startup). Additionally or alternatively the mobile device 1002 may receive information from metrological and/or airport information sources 1010 and or OEM data sources 1012. In examples, the mobile device 1002 provides data to and receives data from the DCCU 1014.

Figure 11:
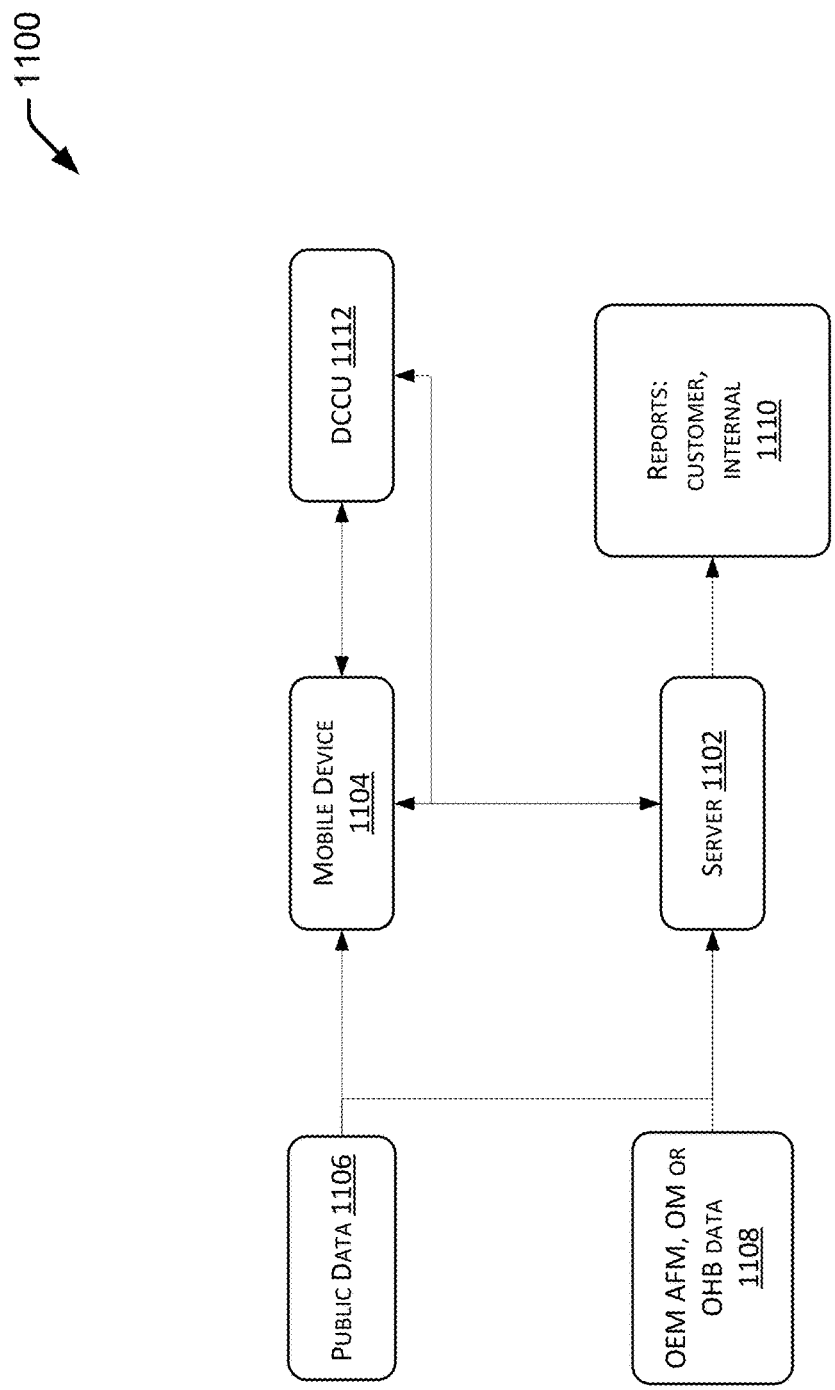

FIG. 11 shows a schematic of an illustrative system 1100 with an illustrative remote server 1102. For example, the remote server 1102 may include a web-based interface. The remote server 1102 may provide fleet data and specific airplane data ready to upload to a user, for example, through a mobile device 1104. The remote server 1102 may monitor metrological and airport information sources 1106, for example, through the internet for current weather, latest airport databases that have runway and other important information. The remote server 1102 may monitor Airplane Flight Manual (AFM) and Operator's Manual (OM) revision status 1108. The remote server 1102 may update databases 1110 for the mobile device and computer to stay current. The remote server 1102 may maintain and update fleet performance database as well as Tail Number specific database. The remote server may monitor customers flight planning software to recognize upcoming flight and to customize performance parameters. In examples, the remote server 1102 communicates with the DCCU 1112.

Illustrative Examples

In examples, the system may allow a user, for example, a pilot, to more readily prepare, execute, and benefit from a flight. For example, during flight planning, the system may use information that is often overlooked or ignored by many people. In examples, the system may initiate a flight planning session based on various triggers. For example, the system may observe a user interacting with other aviation related programs or sites. For example, the system may tell the user that it noticed that the user is looking at aviation websites, the user just filed a flight plan or entered the data somewhere else so it may be beneficial to transfer/copy the data elsewhere that it is needed.

In examples, the system may receive data, either from a user or from available databases (e.g., METARS, Detailed Briefs, databases, flight plans, or RFPs among others) including, but not limited to, route information, ETD, Ramp Weight, CG start, CG end, FOB, Reserve, OAT, surface, winds aloft, temps aloft, Icing, turbulence, Surface winds, Barometer, sky conditions, Rain, Fog, Haze, Mist, anti-ice predictions, Runway Altitude, Runway headings, Runway Gradient, obstacles, Departure procedures, Number of Pax, TOLD, or combinations thereof.

In examples, the system calculates TOLD, Best climb profile, best level off altitude, best cruise speed, best descent speed and rat, landing distances etc. In examples, the system may display MTOW from WAT, Takeoff based on runway, gradient and condition, anti-ice setting. In examples, the system may plot Weight/CG, operating envelope, among other data.

In examples, the system helps a pilot during preflight inspection. For example, the pilot is walking to aircraft which is outside on the ramp, not in the building, or in her personal hangar or where the plane is typically kept, or when pilot acknowledges she is starting her preflight. In examples, the system may record the pilot doing a preflight. For examples, as she walks to plane and initiates the preflight then the system may track her movements by GPS on her phone and how much time she spends inspecting. In examples, the system may receive a spoken record from the pilot of what she is doing during the preflight while the system records it and reads it back to her on future preflights.

In examples, the system may collect data for the preflight. For example, the system may receive or gather information regarding O2 bottle pressure, O2 bottle size, OAT or bottle temp if cold soaked (e.g., where it shows less after landing due to cold soaking), battery status, Dispatchable items, Number of Pax, among others or combinations thereof. In examples, the system may gather the information from the flight plan, RFP, or records related to the specific tail number.

In examples, the system may compare the information and status of the craft with equipment lists associated with the craft and prepare MEL and MMEL comparisons and determine whether and what dispatches need or should be prepared and communicated.

In examples, the system may provide assistance in switching on the battery. For example, the system may collect data, for example, switch positions such as battery switch, MFD, and PFD. The system may also collect data from the sensors indicating GS, IAS, dh/dt, ITT, voltage, aircraft axis direction, windspeed, wind direction, N1 and N2, oil pressure, oil temperature, fuel flow, fuel quantity, weight, CG, parking brake status, air conditioner switch position. In examples, the system may determine whether the aircraft systems are within limits and the battery is ready to be switched on and ready to operate.

In examples, the system assists in engine starts. For example, the system may check that the aircraft systems are ready to start, the start is a good start, and monitor for changes or abnormal operation (e.g., hot, hung, etc). For example, the system collects and monitors N1 and N2 values, fuel flows, ITT, oil pressure, oil temperatures, FOB, among other variables. In examples, the system collects data and provides trend data as the engines come up to temperature, provides warnings if abnormalities are observed, or preserves a history of aircraft operation.

In examples, the system may assist prior to and during taxi of the aircraft. For example, the system may collect N1, N2, Fuel Flow, ITT, Oil Pressure, Oil Temp, FOB, SAT, RAT, GS, ISA, Barometer, Cabin Pressure setting to destination airport, TOLD, GS>0, dh/dt=0, N1, G forces, for fatigue monitor, Rudder Bias Check, individual throttle sweep?, Anti Ice check, N2>85 for a few minutes?, among others. In examples, the system monitors the values and determines whether they are within limits or whether abnormal or undesirable trends are emerging. Based and least in part on the determining, the system may provide the pilot with information, for example, trend data, and/or warnings if appropriate.

In examples, the system may collect and provide guidance during takeoff roll, rotation, $1^{st}$ segment, $2^{nd}$ segment, $3^{rd}$ segment, climb, cruise, decent, initial approach, approach, short approach, final approach, landing, landing roll, after landing clean up, taxi, and/or shutdown.

Illustrative Auto Throttle

FIGS. 12A-D show an illustrative auto throttle operational environment 1200. For example, FIG. 12A shows an auto throttle assembly 1202 installed on an illustrative throttle 1204. Auto throttle assembly 1202 may a carriage 1206 engageable coupled to the throttle 1204. The carriage 1206 may be affixedly coupled to an actuator assembly 1208, for example, a motor 1210, a drive belt 1212, and/or an idler wheel 1214. Additionally or alternatively, various embodiments contemplate that the carriage 1206 may be coupled to a linear actuator that may pivot at one end to account for a curve of the motion of the throttle 1204.

Additionally or alternatively, the carriage and actuator assembly 1208 may be coupled to a mounting base 1216. Various embodiments contemplate that the mounting base 1216 may be removably couplable with a portion of the throttle 1204, for example, the base or baseplate of the throttle 1204.

FIGS. 12C-D show a carriage 1206 in various configurations. For example, FIG. 12C shows carriage 1206 selectively engaged with a portion of the throttle 1204. For example, carriage 1206 may engage throttle 1204 through a magnetic interaction (for example, through a rare-earth or electromagnet), through a mechanical interference, a friction force, or combinations thereof. By coupling the carriage 1206 to the throttle 1204, movement of the carriage 1206 with respect to the base 1216 causes a change in a throttle position of throttle 1204. FIG. 12C also shows carriage 1206 selectively engaged to the throttle 1204 while FIG. 12D shows carriage 1206 selectively disengaged from the throttle 1204.

Figure 13:
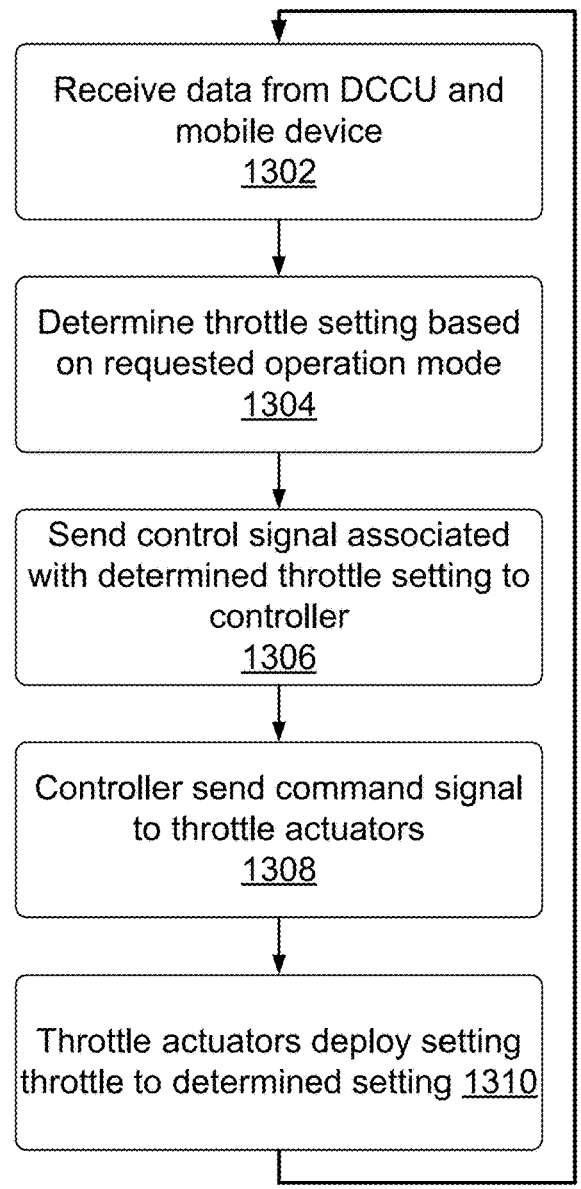
FIG. 13 shows an illustrative process and method of using an auto throttle assembly.

FIG. 13 shows an illustrative throttle control process 1300. For example, at 1302, the throttle control receives data from DCCU and/or mobile device. For example, the connection may be wireless or wired.

At 1304, the throttle control may determine a throttle setting based on a requested operation mode.

At 1306, the throttle control may send a control signal associated with the determined throttle setting to a controller coupled to an actuator.

At 1308, the controller sends the command signal to throttle actuators.

At 1310, the throttle actuators deploy setting throttle to determined setting.

Figure 14A:
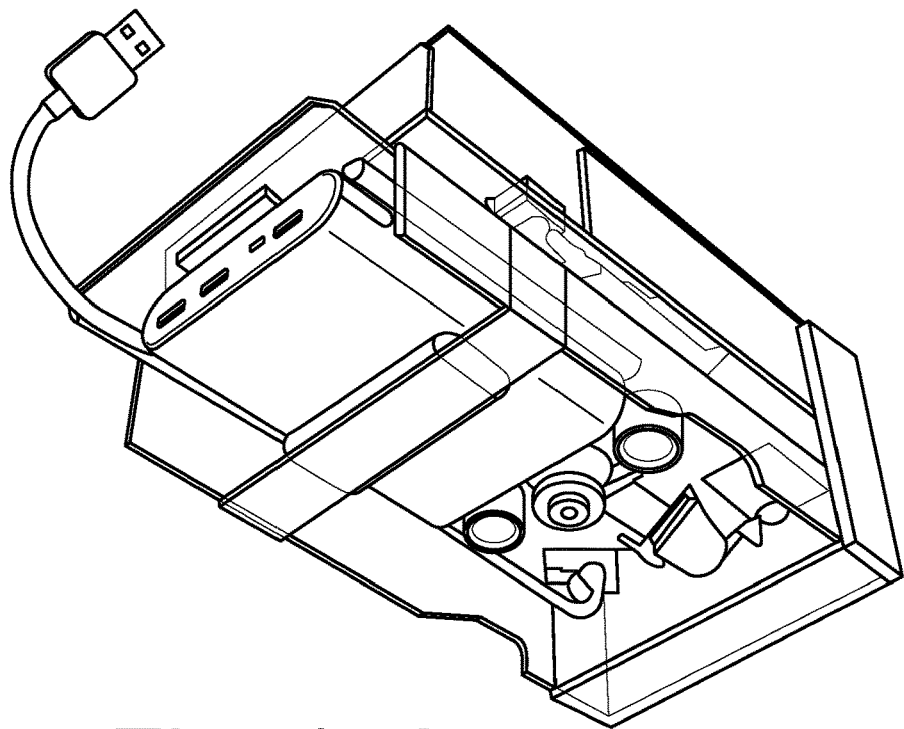
FIGS. 14A-D show multiple perspective views of an illustrative embodiment of a device according to an embodiment of the instant disclosure.
Figure 14B:
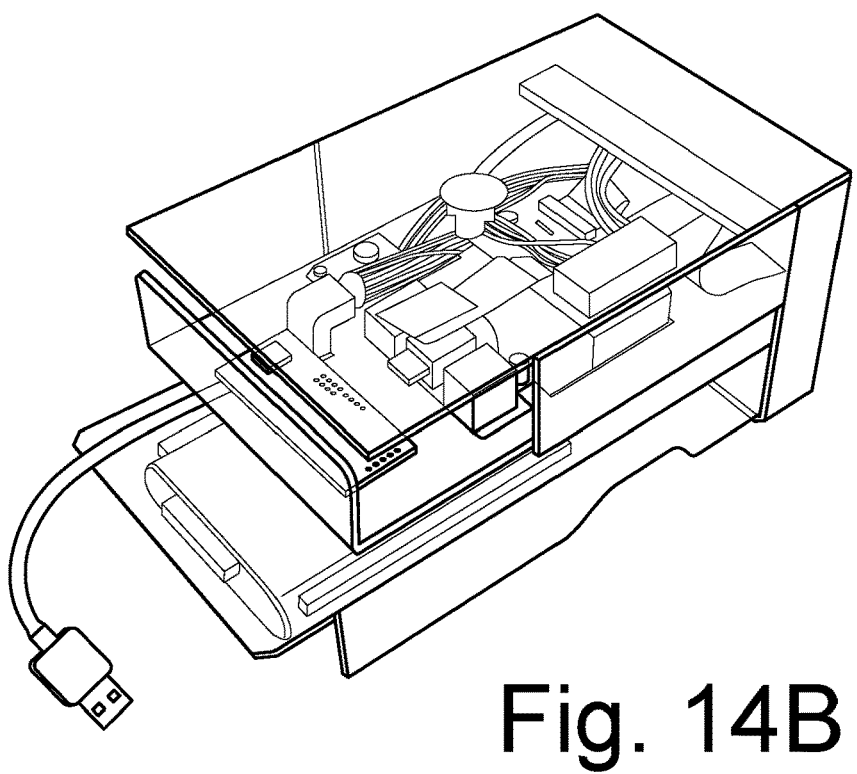
Figure 14C:
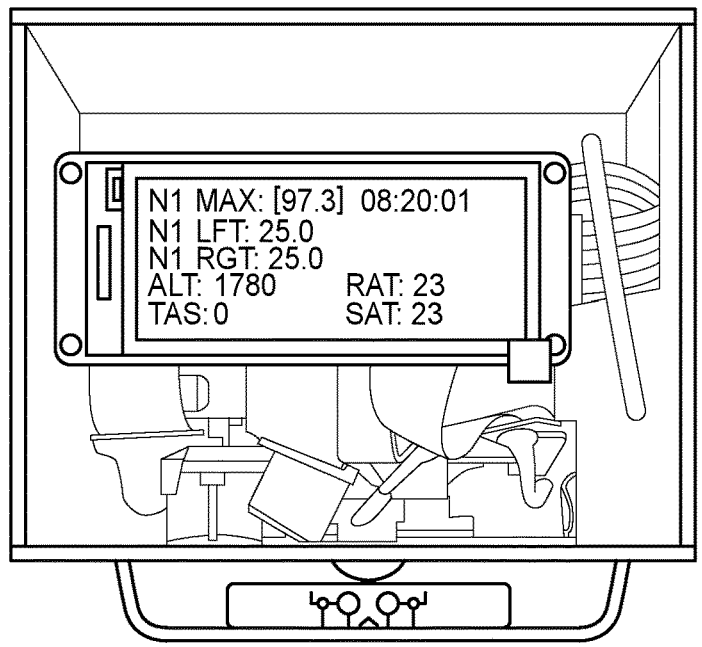
Figure 14D:
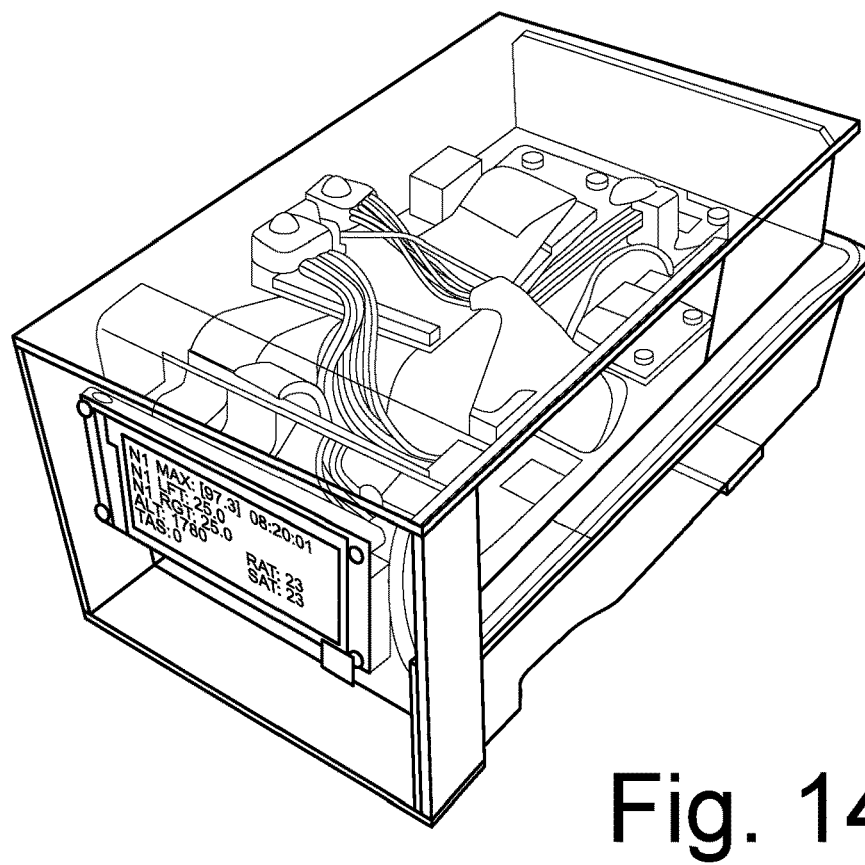

FIGS. 14A-D show various views of an illustrative embodiment. For example, FIG. 14A shows a perspective view of the bottom of the device. FIG. 14B shows a perspective view of the top of the device. FIG. 14C shows a front view of the device, for example, showing a display component with an illustrative display. FIG. 14D shows a perspective view of the top front of the device. For example, FIGS. 14A-D show, among other components, CPU, optical sensors (cameras) GPS receiver/module, barometer, display, camera multiplexor, voltage regulator, chassis, battery, accelerometers, RAM, memory, and communication modules.

Figure 15:
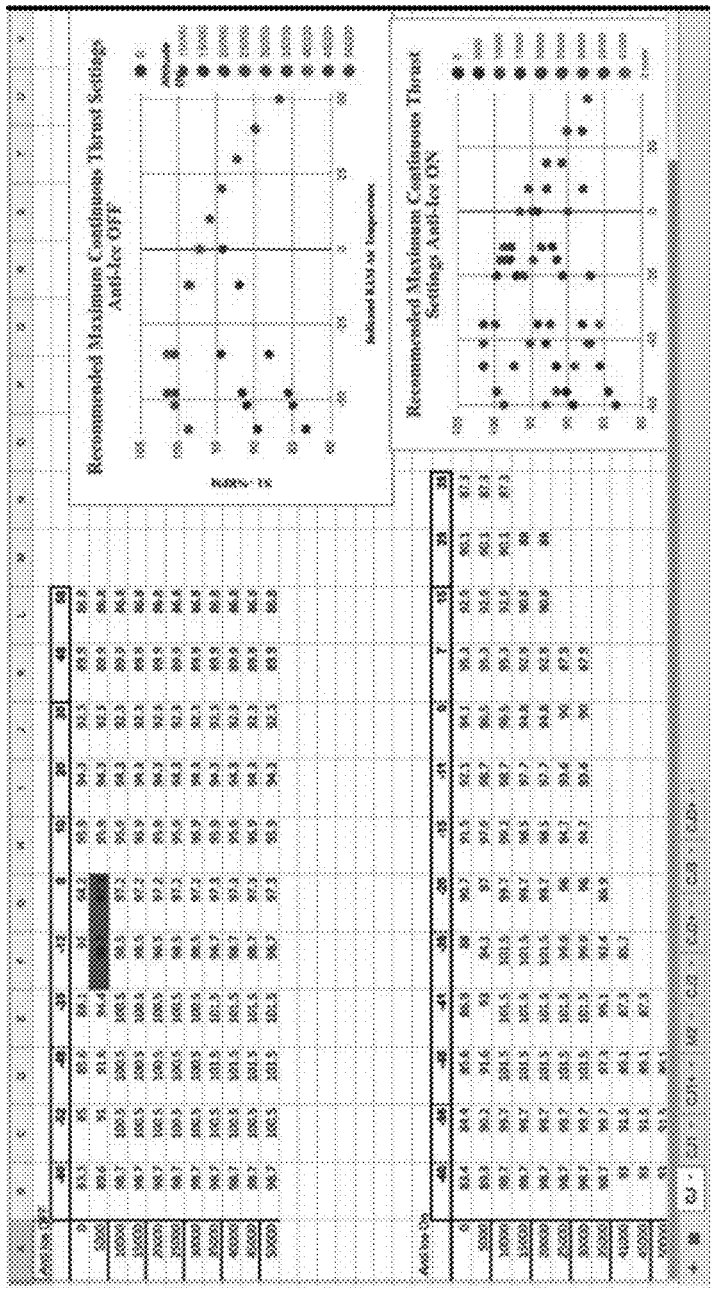
FIG. 15 shows an illustrative display of throttle settings corresponding desired flight modes.

FIG. 15 shows an illustrative display 1500 of throttle settings corresponding desired flight modes. For example, the system may determine optimal throttle settings for a given flight mode, for example, anti-icing.

Example Clauses

Any of the example clauses in this section may be used with any other of the example clauses and/or any of the other examples or embodiments described herein.

A: A flight augmentation system comprising: an optical sensor configured to capture optical information; a processor communicatively coupled to the optical sensor and configured to process the captured optical information, the process the captured optical information including: determine, based at least in part on the captured optical information, one or more flight parameters, aircraft configurations, or combinations thereof evaluate one or more flight parameters, aircraft configurations, or combinations thereof to determine a flight condition; and based at least in part on the determined flight condition, send a control command to an actuator, provide a warning to a user, upload data to a remote storage device, request a determined input from the user, recommend an action by the user, or a combination thereof.

B: The flight augmentation system of clause A, further comprising one or more sensors configured to measure a physical property of an environment of the aircraft, wherein the processor is communicatively coupled to the sensors and configured to receive the measured physical property, wherein the processor is further configured to determine, based at least in part on the measured physical property, one or more flight parameters, aircraft configurations, or combinations thereof.

C: The flight augmentation system of clause A or B, further comprising a throttle actuator communicatively coupled to the processor, the processor further configured to: determining a throttle setting based on a requested operation mode; and cause the throttle actuator to deploy to the determined throttle setting.

D: The flight augmentation system of any of clauses A-C, the processor further configured to: authenticate a pilot associated with a flight; certify data collected during the flight; and provide the data to a third party.

E: The flight augmentation system of any of clauses A-D, the pilot authentication comprising: detecting a movement of a first user associated with a first input to the aircraft; determining a first change in a flight condition; and recording the first user, the first input, and first change in a flight condition.

F: The flight augmentation system of any of clauses A-E, wherein the input comprises a change in a setting of a switch, a lever, a knob, a button, a yoke, a cable, a vernier, or a combination thereof.

G: A method comprising: determining, based at least in part on captured optical information, one or more flight parameters, aircraft configurations, or combinations thereof; evaluating one or more flight parameters, aircraft configurations, or combinations thereof to determine a flight condition; and based at least in part on the determined flight condition, one or more of sending a control command to an actuator, providing a warning to a user, uploading data to a remote storage device, requesting a determined input from the user, recommending an action by the user.

H: The method of clause G, further comprising: receiving a signal indicative of a measured physical property of an environment of the aircraft; and determining, based at least in part on the measured physical property, one or more flight parameters, aircraft configurations, or combinations thereof.

I: A throttle control system comprising: a throttle controller, the throttle controller configured to: receive data from a data collection and computation unit; determine a throttle setting based on a requested operation mode; and a throttle actuator coupled to the throttle controller, the throttle actuator configured to: receive a command signal from the throttle controller associated with the throttle setting; and deploy the throttle actuator to the determined setting.

While the example clauses described above are described with respect to one particular implementation, it should be understood that, in the context of this document, the content of the example clauses may also be implemented via a method, device, system, a computer-readable medium, and/or another implementation.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

The invention claimed is:

1. A flight augmentation system comprising:
   an optical sensor configured to capture optical information;
   a processor communicatively coupled to the optical sensor and configured to process the captured optical information, the process the captured optical information including:
   determine, based at least in part on the captured optical information, one or more flight parameters, aircraft configurations, or combinations thereof;
   evaluate one or more flight parameters, aircraft configurations, or combinations thereof to determine a flight condition; and
   based at least in part on the determined flight condition, send a control command to an actuator, provide a warning to a user, upload data to a remote storage device, request a determined input from the user, recommend an action by the user, or a combination thereof.

2. The flight augmentation system of claim 1, further comprising one or more sensors configured to measure a physical property of an environment of the aircraft, wherein the processor is communicatively coupled to the sensors and configured to receive the measured physical property, wherein the processor is further configured to determine, based at least in part on the measured physical property, one or more flight parameters, aircraft configurations, or combinations thereof.

3. The flight augmentation system of claim 1, further comprising a throttle actuator communicatively coupled to the processor, the processor further configured to:
   determining a throttle setting based on a requested operation mode; and
   cause the throttle actuator to deploy to the determined throttle setting.

4. The flight augmentation system of claim 1, the processor further configured to:
   authenticate a pilot associated with a flight;
   certify data collected during the flight; and
   provide the data to a third party.

5. The flight augmentation system of claim 1, the pilot authentication comprising:
   detecting a movement of a first user associated with a first input to the aircraft;
   determining a first change in a flight condition; and
   recording the first user, the first input, and first change in a flight condition.

6. The flight augmentation system of claim 1, wherein the input comprises a change in a setting of a switch, a lever, a knob, a button, a yoke, a cable, a vernier, or a combination thereof.

7. A method comprising:
   determining, based at least in part on captured optical information, one or more flight parameters, aircraft configurations, or combinations thereof;
   evaluating one or more flight parameters, aircraft configurations, or combinations thereof to determine a flight condition; and
   based at least in part on the determined flight condition, one or more of sending a control command to an actuator, providing a warning to a user, uploading data to a remote storage device, requesting a determined input from the user, recommending an action by the user.

8. The method of claim 7, further comprising:
   receiving a signal indicative of a measured physical property of an environment of the aircraft; and
   determining, based at least in part on the measured physical property, one or more flight parameters, aircraft configurations, or combinations thereof.

9. A throttle control system comprising:
   a throttle controller, the throttle controller configured to:
   receive data from a data collection and computation unit;
   determine a throttle setting based on a requested operation mode; and
   a throttle actuator coupled to the throttle controller, the throttle actuator configured to:
   receive a command signal from the throttle controller associated with the throttle setting; and
   deploy the throttle actuator to the determined setting.

* * * * *